(12) United States Patent
Hannuksela

(10) Patent No.: US 10,070,125 B2
(45) Date of Patent: Sep. 4, 2018

(54) METHOD AND APPARATUS FOR VIDEO CODING AND DECODING

(71) Applicant: Nokia Technologies Oy, Espoo (FI)

(72) Inventor: Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 469 days.

(21) Appl. No.: 14/447,952

(22) Filed: Jul. 31, 2014

(65) Prior Publication Data

US 2015/0078456 A1 Mar. 19, 2015

Related U.S. Application Data

(60) Provisional application No. 61/860,551, filed on Jul. 31, 2013.

(51) Int. Cl.
*H04N 19/30* (2014.01)
*H04N 19/70* (2014.01)
*H04N 19/44* (2014.01)
*H04N 19/597* (2014.01)
*H04N 19/42* (2014.01)

(52) U.S. Cl.
CPC ....... *H04N 19/00424* (2013.01); *H04N 19/30* (2014.11); *H04N 19/42* (2014.11); *H04N 19/44* (2014.11); *H04N 19/597* (2014.11); *H04N 19/70* (2014.11)

(58) Field of Classification Search
CPC combination set(s) only.
See application file for complete search history.

(56) References Cited

U.S. PATENT DOCUMENTS

| 2008/0267287 A1 | 10/2008 | Hannuksela |
| 2011/0110418 A1 | 5/2011 | Lu et al. |
| 2014/0355692 A1* | 12/2014 | Ramasubramonian ..... H04N 19/597 375/240.26 |

OTHER PUBLICATIONS

MV-HEVC Draft Text 3 (ISO/IEC 23008-2:201x/PDAM2), Tech et al., JCT3V-C1004_d3, Joint Collaborative Team on 3D Video Coding Extension Development of ITU-T SG 16 WP 3 and ISO/IEC JTC 1/SC 29/WG 11, 3rd meeting: Geneva, CH, Jan. 17-23, 2013 (Year: 2013).*

Hannuksela, "MV-HEVC/SHVC HLS: Layer-Wise Startup of the Decoding Process", Joint Collaborative Team on Video Coding (JCT-VC) of ITU-T SG 16 WP 3 and ISO/IEC JTC 1/SC 29/WG 11, Document: JCTVC-M0206, Apr. 18-26, 2013, pp. 1-5.

Sjoberg et al., "Overview of HEVC High-Level Syntax and Reference Picture Management", IEEE Transactions on Circuits and Systems for Video Technology, vol. 22, Issue: 12, Dec. 2012, pp. 1858-1870.

(Continued)

*Primary Examiner* — Janese Duley
(74) *Attorney, Agent, or Firm* — Alston & Bird LLP

(57) ABSTRACT

The invention relates to concatenating or splicing of scalable video bitstreams. There are disclosed various methods, apparatuses and computer program products for video encoding and decoding and modifying coded video bitstreams. In some embodiments, indications are provided in the coded video bitstream to indicate a layer-wise decoding start-up process. These indications may be generated by encoders or splicers.

19 Claims, 8 Drawing Sheets

(56) References Cited

OTHER PUBLICATIONS

International Search Report and Written Opinion received for corresponding Patent Cooperation Treaty Application No. PCT/FI2014/050602, dated Nov. 5, 2014, 13 pages.
"Advanced Video Coding for Generic Audiovisual Services", Series H: Audiovisual and Multimedia Systems, Infrastructure of audiovisual services—Coding of movingVideo, ITU-T Recommendation H.264, Apr. 2013, 732 Pages.
"High Efficiency Video Coding", Series H: Audiovisual and Multimedia Systems, Infrastructure of audiovisual services—Coding of moving video, ITU-T Recommendation H.265, Apr. 2013, 317 Pages.
Chen et al., "AHG9: Header Parameter Set (HPS)", Joint Collaborative Team on Video Coding (JCT-VC) of ITU-T SG16 WP3 and ISO/IEC JTC1/SC29/WG11, JCTVC-J0109, 10th Meeting, Jul. 11-20, 2012, pp. 1-12.
Suzuki et al., "MVC Extension for Inclusion of Depth Maps Draft Text 4", Joint Collaborative Team on 3D Video Coding Extension Development of ITU-T SG 16 WP 3 and ISO/IEC JTC 1/SC 29/WG 11, JCT2-A1001, 1st Meeting, Jul. 16-20, 2012, pp. 1-74.
"Parameter Values for Ultra-High Definition Television Systems for Production and International Programme Exchange", Recommendation ITU-R BT.2020, Aug. 2012, 7 pages.
"Parameter Values for the HDTV Standards for Production and International Programme Exchange", Recommendation ITU-R BT.709-5, Apr. 2002, 32 pages.
Office Action for Taiwanese Application No. 103126235 dated Mar. 27, 2017
U.S. Appl. No. 61/843,991, filed Jul. 9, 2013; In re: Hannuksela, entitled *Method and Apparatus for Video Coding and Decoding*.

* cited by examiner

METHOD AND APPARATUS FOR VIDEO CODING AND DECODING

TECHNICAL FIELD

The present application relates generally to an apparatus, a method and a computer program for video coding and decoding. More particularly, various embodiments relate to coding and decoding of scalable video.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Scalable video coding refers to a coding structure where one bitstream can contain multiple representations of the content at different bitrates, resolutions, frame rates and/or other types of scalability. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. Each layer together with all its dependent layers is one representation of the video signal at a certain spatial resolution, temporal resolution, quality level, and/or operation point of other types of scalability.

SUMMARY

The invention relates to concatenating or splicing of scalable video bitstreams. There are disclosed various methods, apparatuses and computer program products for video encoding and decoding and modifying coded video bitstreams. In some embodiments, indications are provided in the coded video bitstream to indicate a layer-wise decoding start-up process. These indications may be generated by encoders or splicers.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 2:
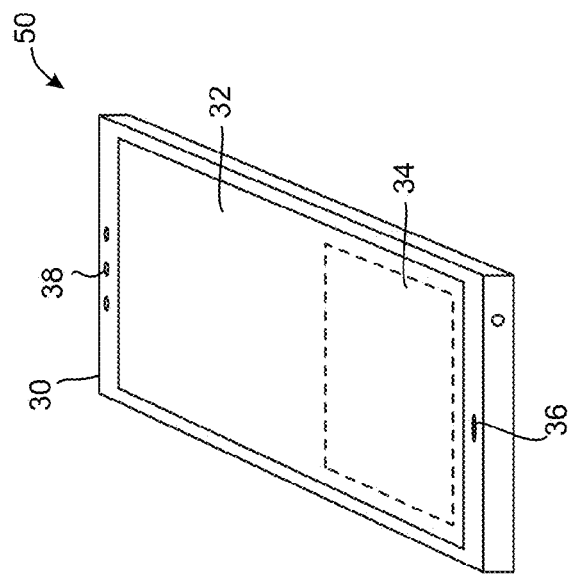
FIG. 2 shows schematically a user equipment suitable for employing some embodiments of the invention.

In the following, several embodiments of the invention will be described in the context of one video coding arrangement. It is to be noted, however, that the invention is not limited to this particular arrangement. In fact, the different embodiments have applications widely in any environment where improvement of 3D video coding is desired. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding (H.265/HEVC) standard was developed by the Joint Collaborative Team—Video Coding (JCT-VC) of VCEG and MPEG. Currently, the H.265/HEVC standard is undergoing the final approval ballots in ISO/IEC and ITU-T. The standard will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

When describing H.264/AVC and HEVC as well as in example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

When describing H.264/AVC and HEVC as well as in example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table:

| codeNum | syntax element value |
| --- | --- |
| 0 | 0 |
| 1 | 1 |
| 2 | −1 |
| 3 | 2 |
| 4 | −2 |
| 5 | 3 |
| 6 | −3 |
| . . . | . . . |

When describing H.264/AVC and HEVC as well as in example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoder may be referred to as a decoded picture.

The source and decoded pictures may each be comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated e.g. in a coded bitstream e.g. using the Video Usability Information (VUI) syntax of H.264/AVC and/or HEVC. A component may be defined as an array or a single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or may be subsampled when compared to luma sample arrays.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of a draft HEVC standard may be partitioned into prediction units and separately by another quadtree into transform units.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In one draft version of the HEVC standard, pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can further be split into a combination of smaller CUs, e.g. by recursively splitting the LCU and resultant CUs. Each resulting CU may have at least one PU and at least one TU associated with it. Each PU and TU can further be split into smaller PUs and TUs in order to increase granularity of the prediction and prediction error coding processes, respectively. Each PU may have prediction information associated with it defining what kind of a prediction is to be applied for the pixels within that PU (e.g. motion vector information for inter predicted PUs and intra prediction directionality information for intra predicted PUs). Similarly, each TU may be associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU. In some embodiments the PU splitting can be realized by splitting the CU into four equal size square PUs or splitting the CU into two rectangle PUs vertically or horizontally in a symmetric or asymmetric way. The division of the image into CUs, and division of CUs into PUs and TUs may be signalled in the bitstream allowing the decoder to reproduce the intended structure of these units.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as a prediction reference for the forthcoming frames in the video sequence.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

A basic coding unit in a HEVC working draft 5 (WD5) is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs. A CTU may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units may be regarded as a partitioning. A CTB may be defined as an N×N block of samples for some value of N. The division of one of the arrays that compose a picture that has three sample arrays or of the array that compose a picture in monochrome format or a picture that is coded using three separate colour planes into coding tree blocks may be regarded as a partitioning. A coding block may be defined as an N×N block of samples for some value of N. The division of a coding tree block into coding blocks may be regarded as a partitioning.

Figure 7:
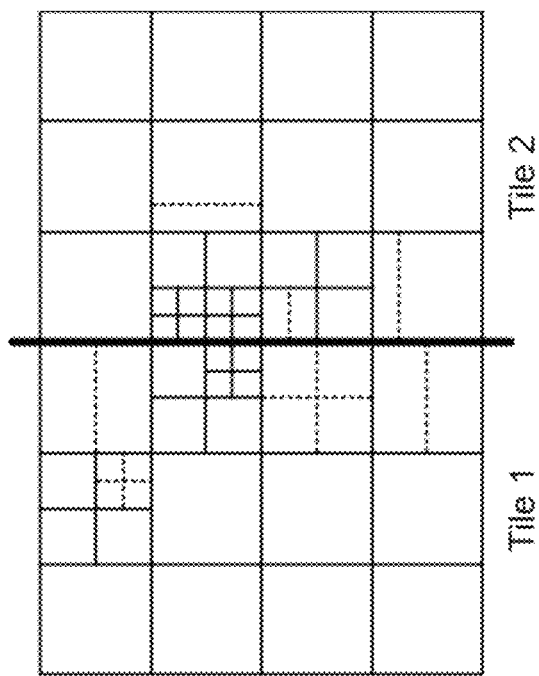
FIG. 7 shows an example of a picture consisting of two tiles.

FIG. 7 shows an example of a picture consisting of two tiles partitioned into square coding units (solid lines) which have further been partitioned into rectangular prediction units (dashed lines).

In HEVC, a slice may be defined as an integer number of coding tree units contained in one independent slice segment and all subsequent dependent slice segments (if any) that precede the next independent slice segment (if any) within the same access unit. An independent slice segment may be defined as a slice segment for which the values of the syntax elements of the slice segment header are not inferred from the values for a preceding slice segment. A dependent slice segment may be defined as a slice segment for which the values of some syntax elements of the slice segment header are inferred from the values for the preceding independent slice segment in decoding order. In other words, only the independent slice segment may have a "full" slice header. An independent slice segment may be conveyed in one NAL unit (without other slice segments in the same NAL unit) and likewise a dependent slice segment may be conveyed in one NAL unit (without other slice segments in the same NAL unit).

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus 1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, LayerId, nuh_layer_id and layer_id are used interchangeably unless otherwise indicated.

It is expected that nuh_layer_id and/or similar syntax elements in NAL unit header would carry information on the scalability hierarchy. For example, the LayerId value nuh_layer_id and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In a draft HEVC standard, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In a draft HEVC standard, a coded slice NAL unit can be indicated to be one of the following types.

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP BLA_N_LP | Coded slice segment of a BLA picture slice_segment_layer_rbsp( ) |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 . . . RSV_RAP_VCL23 | Reserved // reserved RAP VCL NAL unit types |
| 24 . . . 31 | RSV_VCL24 . . . RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

Decodable leading pictures may be such that can be correctly decoded when the decoding is started from the CRA picture. In other words, decodable leading pictures use only the initial CRA picture or subsequent pictures in decoding order as reference in inter prediction. Non-decodable leading pictures are such that cannot be correctly decoded when the decoding is started from the initial CRA picture. In other words, non-decodable leading pictures use pictures prior, in decoding order, to the initial CRA picture as references in inter prediction.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. BLA_W_DLP may also be referred to as BLA_W_RADL. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_DLP does not have associated RASL pictures present in the bitstream, but may have associated RADL pictures in the bitstream. IDR_W_DLP may also be referred to as IDR_W_RADL.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

Another means of describing picture types of a draft HEVC standard is provided next. As illustrated in Error! Reference source not found. Error! Reference source not found. the table below, picture types can be classified into the following groups in HEVC: a) random access point (RAP) pictures, b) leading pictures, c) sub-layer access pictures, and d) pictures that do not fall into the three mentioned groups. The picture types and their sub-types as described in the table below are identified by the NAL unit type in HEVC. RAP picture types include IDR picture, BLA picture, and CRA picture, and can further be characterized based on the leading pictures associated with them as indicated in the table below.

| a) Random access point pictures | | |
|---|---|---|
| IDR | Instantaneous decoding refresh | without associated leading pictures<br>may have associated leading pictures |
| BLA | Broken link access | without associated leading pictures<br>may have associated DLP pictures but without associated TFD pictures<br>may have associated DLP and TFD pictures |
| CRA | Clean random access | may have associated leading pictures |
| b) Leading pictures | | |
| DLP | Decodable leading picture | |
| TFD | Tagged for discard | |
| c) Temporal sub-layer access pictures | | |
| TSA | Temporal sub-layer access | not used for reference in the same sub-layer<br>may be used for reference in the same sub-layer |
| STSA | Step-wise temporal sub-layer access | not used for reference in the same sub-layer<br>may be used for reference in the same sub-layer |
| d) Picture that is not RAP, leading or temporal sub-layer access picture | | |
| | | not used for reference in the same sub-layer<br>may be used for reference in the same sub-layer |

CRA pictures in HEVC allow pictures that follow the CRA picture in decoding order but precede it in output order to use pictures decoded before the CRA picture as a reference and still allow similar clean random access functionality as an IDR picture. Pictures that follow a CRA picture in both decoding and output order are decodable if random access is performed at the CRA picture, and hence clean random access is achieved.

Leading pictures of a CRA picture that do not refer to any picture preceding the CRA picture in decoding order can be correctly decoded when the decoding starts from the CRA picture and are therefore DLP pictures. In contrast, a TFD picture cannot be correctly decoded when decoding starts from a CRA picture associated with the TFD picture (while the TFD picture could be correctly decoded if the decoding had started from a RAP picture before the current CRA picture). Hence, TFD pictures associated with a CRA may be discarded when the decoding starts from the CRA picture.

When a part of a bitstream starting from a CRA picture is included in another bitstream, the TFD pictures associated with the CRA picture cannot be decoded, because some of their reference pictures are not present in the combined bitstream. To make such splicing operation straightforward, the NAL unit type of the CRA picture can be changed to indicate that it is a BLA picture. The TFD pictures associated with a BLA picture may not be correctly decodable hence should not be output/displayed. The TFD pictures associated with a BLA picture may be omitted from decoding.

In HEVC there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

In HEVC, a coded video sequence (CVS) may be defined as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an IDR access unit, a BLA access unit, or a CRA access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1. NoRaslOutputFlag equal to 1 has an impact that the RASL pictures associated with the IRAP picture for which the NoRaslOutputFlag is set are not output by the decoder. HandleCraAsBlaFlag may be set to 1 for example by a player that seeks to a new position in a bitstream or tunes into a broadcast and starts decoding and then starts decoding from a CRA picture.

In scalable and/or multiview video coding, at least the following principles for encoding pictures and/or access units with random access property may be supported.

A RAP picture within a layer may be an intra-coded picture without inter-layer/inter-view prediction. Such a picture enables random access capability to the layer/view it resides.

A RAP picture within an enhancement layer may be a picture without inter prediction (i.e. temporal prediction) but with inter-layer/inter-view prediction allowed. Such a picture enables starting the decoding of the layer/view the picture resides provided that all the reference layers/views are available. In single-loop decoding, it may be sufficient if the coded reference layers/views are available (which can be the case e.g. for IDR pictures having dependency_id greater than 0 in SVC). In multi-loop decoding, it may be needed that the reference layers/views are decoded. Such a picture may, for example, be referred to as a stepwise layer access (STLA) picture or an enhancement layer RAP picture.

An anchor access unit or a complete RAP access unit may be defined to include only intra-coded picture(s) and STLA pictures in all layers. In multi-loop decoding, such an access unit enables random access to all layers/views. An example of such an access unit is the MVC anchor access unit (among which type the IDR access unit is a special case).

A stepwise RAP access unit may be defined to include a RAP picture in the base layer but need not contain a RAP picture in all enhancement layers. A stepwise RAP access unit enables starting of base-layer decoding, while enhancement layer decoding may be started when the enhancement layer contains a RAP picture, and (in the case of multi-loop decoding) all its reference layers/views are decoded at that point.

In a scalable extension of HEVC or any scalable extension for a single-layer coding scheme similar to HEVC, RAP pictures may be specified to have one or more of the following properties.

NAL unit type values of the RAP pictures with nuh_layer_id greater than 0 may be used to indicate enhancement layer random access points.

An enhancement layer RAP picture may be defined as a picture that enables starting the decoding of that enhancement layer when all its reference layers have been decoded prior to the EL RAP picture.

Inter-layer prediction may be allowed for CRA NAL units with nuh_layer_id greater than 0, while inter prediction is disallowed.

CRA NAL units need not be aligned across layers. In other words, a CRA NAL unit type can be used for all VCL NAL units with a particular value of nuh_layer_id while another NAL unit type can be used for all VCL NAL units with another particular value of nuh_layer_id in the same access unit.

BLA pictures have nuh_layer_id equal to 0.

IDR pictures may have nuh_layer_id greater than 0 and they may be inter-layer predicted while inter prediction is disallowed.

IDR pictures are present in an access unit either in no layers or in all layers, i.e. an IDR nal_unit_type indicates a complete IDR access unit where decoding of all layers can be started.

An STLA picture (STLA_W_DLP and STLA_N_LP) may be indicated with NAL unit types BLA_W_DLP and BLA_N_LP, respectively, with nuh_layer_id greater than 0. An STLA picture may be otherwise identical to an IDR picture with nuh_layer_id greater than 0 but needs not be aligned across layers.

After a BLA picture at the base layer, the decoding of an enhancement layer is started when the enhancement layer contains a RAP picture and the decoding of all of its reference layers has been started.

When the decoding of an enhancement layer starts from a CRA picture, its RASL pictures are handled similarly to RASL pictures of a BLA picture.

Layer down-switching or unintentional loss of reference pictures is identified from missing reference pictures, in which case the decoding of the related enhancement layer continues only from the next RAP picture on that enhancement layer.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit (having NAL unit type equal to 7) containing all the data for H.264/AVC VCL NAL units in the sequence, the sequence parameter set extension NAL unit containing the data for auxiliary coded pictures, and the subset sequence parameter set for MVC and SVC VCL NAL units. The syntax structure included in the sequence parameter set NAL unit of H.264/AVC (having NAL unit type equal to 7) may be referred to as sequence parameter set data, seq_parameter_set_data, or base SPS data. For example, profile, level, the picture size and the chroma sampling format may be included in the base SPS data. A picture parameter set contains such parameters that are likely to be unchanged in several coded pictures.

In a draft HEVC, there was also another type of a parameter set, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), sample adaptive offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. However, APS was not included in the final H.265/HEVC standard.

H.265/HEVC also includes another type of a parameter set, called a video parameter set (VPS). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view)

layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation.

An example syntax of a VPS extension intended to be a part of the VPS is provided in the following. The presented VPS extension provides the dependency relationships among other things.

| | Descriptor |
|---|---|
| vps_extension( ) { | |
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j <NumScalabilityTypes; j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     for( j = 0; j < NumScalabilityTypes; j++ ) | |
|       dimension_id[ i ][ j ] | u(v) |
|   } | |
|   for( i = 1; i <= vps_num_op_sets_minus1; i ++ ) { | |
|     vps_profile_present_flag[ i ] | u(1) |
|     if( !vps_profile_present_flag[ i ] ) | |
|       profile_op_ref_minus1[ i ] | ue(v) |
|     profile_tier_level( vps_profile_present_flag[ i ], | |
|       vps_max_sub_layers_minus1) | |
|   } | |
|   num_output_operation_points | ue(v) |
|   for( i = 0; i < num_output_operation_points; i++ ) { | |
|     output_op_point_index[ i ] | ue(v) |
|     for( j = 0 ; | |
|       j <= vps_max_nuh_reserved_zero_layer_id; j++) | |
|       if( op_layer_id_included_flag[ op_point_index[ i ] ][ i ] ) | |
|         output_layer_flag[ op_point_index[ i ] ][ j ] | u(1) |
|   } | |
|   for( i = 1; i <= vps_max_layers_minus1; i++ ) { | |
|     for( j = 0; j < i; j++ ) | |
|       direct_dependency_flag[ i ][ j ] | u(1) |
| } | |

The semantics of the presented VPS extension may be specified as described in the following paragraphs.

vps_extension_byte_alignment_reserved_one_bit is equal to 1 and is used to achieve alignment of the next syntax element to a byte boundary. avc_base_layer_flag equal to 1 specifies that the base layer conforms to H.264/AVC, equal to 0 specifies that it conforms to this specification. The semantics of avc_base_layer_flag may be further specified as follows. When avc_base_layer_flag equal to 1, in H.264/AVC conforming base layer, after applying the H.264/AVC decoding process for reference picture lists construction the output reference picture lists refPicList0 and refPicList1 (when applicable) does not contain any pictures for which the TemporalId is greater than TemporalId of the coded picture. All sub-bitstreams of the H.264/AVC conforming base layer that can be derived using the sub-bitstream extraction process as specified in H.264/AVC Annex G with any value for temporal_id as the input result in a set of coded video sequences, with each coded video sequence conforming to one or more of the profiles specified in H.264/AVC Annexes A, G and H.

splitting_flag equal to 1 indicates that the bits of the nuh_layer_id syntax element in the NAL unit header are split into n segments with a length, in bits, according to the values of the dimension_id_len_minus1[i] syntax element and that the n segments are associated with the n scalability dimensions indicated in scalability_mask_flag[i]. When splitting_flag is equal to 1, the value of the j-th segment of the nuh_layer_id of i-th layer shall be equal to the value of dimension_id[i][j]. splitting_flag equal to 0 does not indicate the above constraint. When splitting_flag is equal to 1, i.e. the restriction reported in the semantics of the dimension_id [i][j] syntax element is obeyed, scalable identifiers can be derived from the nuh_layer_id syntax element in the NAL unit header by a bit masked copy as an alternative to the derivation as reported in the semantics of the dimension_id [i][j] syntax element. The respective bit mask for the i-th scalable dimension is defined by the value of the dimension_id_len_minus1[i] syntax element and dimBitOffset[i] as specified in the semantics of dimension_id_len_minus1 [j].

scalability_mask[i] equal to 1 indicates that dimension_id syntax elements corresponding to the i-th scalability dimension are present. scalability_mask[i] equal to 0 indicates that dimension_id syntax elements corresponding to the i-th scalability dimension are not present. The scalability dimensions corresponding to each value of i in scalability_mask[i] may be specified for example to include the following or any subset thereof along with other scalability dimensions.

| scalability_mask index | Scalability dimension | ScalabilityId mapping |
|---|---|---|
| 0 | multiview | ViewId |
| 1 | reference index based spatial or quality scalability | DependencyId |
| 2 | depth | DepthFlag |
| 3 | TextureBL based spatial or quality scalability | TextureBLDepId | dimension_id_len_minus1[j] plus 1 specifies the length, in bits, of the dimension_id[i][j] syntax element. The variable dimBitOffset[j] is derived as follows. The variable dimBitOffset[0] is set to 0. dimBitOffset[j] is derived to be equal to a cumulative sum in the range of dimIdx from 0 to j−1, inclusive, for dimension_id_len_minus1[dimIdx]+1).

vps_nuh_layer_id_present_flag specifies whether the layer_id_in_nuh[i] syntax is present. layer_id_in_nuh[i] specifies the value of the nuh_layer_id syntax element in VCL NAL units of the i-th layer. When not present, the value of layer_id_in_nuh[i] is inferred to be equal to i. layer_id_in_nuh[i] is greater than layer_id_in_nuh[i−1]. The variable LayerIdInVps[layer_id_in_nuh[i]] is set equal to i.

dimension_id[i][j] specifies the identifier of the j-th scalability dimension type of the i-th layer. When not present, the value of dimension_id[i][j] is inferred to be equal to 0. The number of bits used for the representation of dimension_id[i][j] is dimension_id_len_minus1[j]+1 bits.

dimension_id[i][j] and scalability_mask[i] may be used to derive variables associating scalability dimension values to layers. For example, the variables ScalabilityId[layerIdInVps][scalabilityMaskIndex] andViewId[layerIdInNuh] may be derived as follows:

```
for (i = 0; i <= vps_max_layers_minus1; i++) {
    for( smIdx= 0, j =0; smIdx< 16; smIdx ++ )
        if( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = ScalabilityId[ i ][ 0 ]
}
```

Similarly, variables DependencyId[layerIdInNuh], DepthFlag[layerIdInNuh], and TextureBLDepId[layerIdInNuh] may be derived e.g. as follows:

```
for (i = 0; i <= vps_max_layers_minus1; i++) {
    for( smIdx= 0, j =0; smIdx< 16; smIdx ++ )
        if( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    DependencyId[ layer_id_in_nuh[ i ] ] = ScalabilityId[ i ][ 1 ]
    DepthFlag[ layer_id_in_nuh[ i ] ] = ScalabilityId[ i ][ 2 ]
    TextureBLDepId[ layer_id_in_nuh[ i ] ] = ScalabilityId[ i ][ 3 ]
}
``` vps_profile_present_flag[i] equal to 1 specifies that the profile and tier information for operation point i is present in the profile_tier_level( ) syntax structure. vps_profile_present_flag[i] equal to 0 specifies that profile and tier information for operation point i is not present in the profile_tier_level( ) syntax structure and is inferred.

profile_op_ref_minus1[i] indicates that the profile and tier information for the i-th operation point is inferred to be equal to the profile and tier information from the (profile_op_ref_minus1[i]+1)-th operation point.

num_output_operation_points specifies the number of operation points for which output layers are specified with output_op_point_index[i] and output_layer_flag. When not present, the value of num_output_operation_points is inferred to be equal to 0.

output_op_point_index[i] identifies the operation point for which output_layer_flag[op_point_index[i]][j] applies to.

output_layer_flag[output_op_point_index[i]][j] equal to 1 specifies that the layer with nuh_layer_id equal to j is a target output layer of the operation point identified by output_op_point_index[i]. output_layer_flag[output_op_point_index[i]][j] equal to 0 specifies that the layer with nuh_layer_id equal to j is not a target output layer of the operation point identified by output_op_point_index[i].

For each operation point index j not equal to output_op_point_index[i] for any value of i in the range 0 to num_output_operation_points−1, inclusive, let highestLayerId be the greatest value of nuh_layer_id within the operation point of index j. output_layer_flag[j][k] is inferred to be equal to 0 for all values of k in the range of 0 to 63, inclusive, unequal to highestLayerId. output_layer_flag[j][highestLayerId] is inferred to be equal to 1.

In other words, when an operation point is not included among those indicated by output_op_point_index[i], the layer with the greatest value of nuh_layer_id within the operation point is the only target output layer of the operation point.

direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_num_layers_minus1, it is inferred to be equal to 0.

The variables NumDirectRefLayers[i] and RefLayerId[i][j] are derived as follows:

```
for( i = 1; i <= vps_max_layers_minus1; i++ )
    for( j = 0, NumDirectRefLayers[ i ] = 0; j < i; j++ )
        if( direct_dependency_flag[ i ][ j ] == 1 )
            RefLayerId[ i ][ NumDirectRefLayers[ i ]++ ] =
                layer_id_in_nuh[ j ]
```

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a draft HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message. In the following, non-limiting examples of activation of parameter sets in a draft HEVC standard are given.

Each adaptation parameter set RBSP is initially considered not active at the start of the operation of the decoding process. At most one adaptation parameter set RBSP is considered active at any given moment during the operation of the decoding process, and the activation of any particular adaptation parameter set RBSP results in the deactivation of the previously-active adaptation parameter set RBSP (if any).

When an adaptation parameter set RBSP (with a particular value of aps_id) is not active and it is referred to by a coded slice NAL unit (using that value of aps_id), it is activated. This adaptation parameter set RBSP is called the active adaptation parameter set RBSP until it is deactivated by the activation of another adaptation parameter set RBSP. An adaptation parameter set RBSP, with that particular value of aps_id, is available to the decoding process prior to its activation, included in at least one access unit with temporal_id equal to or less than the temporal_id of the adaptation parameter set NAL unit, unless the adaptation parameter set is provided through external means.

Each picture parameter set RBSP is initially considered not active at the start of the operation of the decoding process. At most one picture parameter set RBSP is considered active at any given moment during the operation of the decoding process, and the activation of any particular picture parameter set RBSP results in the deactivation of the previously-active picture parameter set RBSP (if any).

When a picture parameter set RBSP (with a particular value of pic_parameter_set_id) is not active and it is referred to by a coded slice NAL unit or coded slice data partition A NAL unit (using that value of pic_parameter_set_id), it is activated. This picture parameter set RBSP is called the active picture parameter set RBSP until it is deactivated by the activation of another picture parameter set RBSP. A picture parameter set RBSP, with that particular value of pic_parameter_set_id, is available to the decoding process prior to its activation, included in at least one access unit with temporal_id equal to or less than the temporal_id of the picture parameter set NAL unit, unless the picture parameter set is provided through external means.

Each sequence parameter set RBSP is initially considered not active at the start of the operation of the decoding process. At most one sequence parameter set RBSP is considered active at any given moment during the operation of the decoding process, and the activation of any particular sequence parameter set RBSP results in the deactivation of the previously-active sequence parameter set RBSP (if any).

When a sequence parameter set RBSP (with a particular value of seq_parameter_set_id) is not already active and it is referred to by activation of a picture parameter set RBSP (using that value of seq_parameter_set_id) or is referred to by an SEI NAL unit containing a buffering period SEI message (using that value of seq_parameter_set_id), it is activated. This sequence parameter set RBSP is called the active sequence parameter set RBSP until it is deactivated by the activation of another sequence parameter set RBSP. A sequence parameter set RBSP, with that particular value of seq_parameter_set_id is available to the decoding process prior to its activation, included in at least one access unit with temporal_id equal to 0, unless the sequence parameter set is provided through external means. An activated sequence parameter set RBSP remains active for the entire coded video sequence.

Each video parameter set RBSP is initially considered not active at the start of the operation of the decoding process. At most one video parameter set RBSP is considered active at any given moment during the operation of the decoding process, and the activation of any particular video parameter set RBSP results in the deactivation of the previously-active video parameter set RBSP (if any).

When a video parameter set RBSP (with a particular value of video_parameter_set_id) is not already active and it is referred to by activation of a sequence parameter set RBSP (using that value of video_parameter_set_id), it is activated. This video parameter set RBSP is called the active video parameter set RBSP until it is deactivated by the activation of another video parameter set RBSP. A video parameter set RBSP, with that particular value of video_parameter_set_id is available to the decoding process prior to its activation, included in at least one access unit with temporal_id equal to 0, unless the video parameter set is provided through external means. An activated video parameter set RBSP remains active for the entire coded video sequence.

During operation of the decoding process in a draft HEVC standard, the values of parameters of the active video parameter set, the active sequence parameter set, the active picture parameter set RBSP and the active adaptation parameter set RBSP are considered in effect. For interpretation of SEI messages, the values of the active video parameter set, the active sequence parameter set, the active picture parameter set RBSP and the active adaptation parameter set RBSP for the operation of the decoding process for the VCL NAL units of the coded picture in the same access unit are considered in effect unless otherwise specified in the SEI message semantics.

Parameter set syntax structures of other types than those presented earlier have also been proposed. In the following paragraphs, some of the proposed types of parameter sets are described.

It has been proposed that at least a subset of syntax elements that have conventionally been included in a slice header are included in a GOS (Group of Slices) parameter set by an encoder. An encoder may code a GOS parameter set as a NAL unit. GOS parameter set NAL units may be included in the bitstream together with for example coded slice NAL units, but may also be carried out-of-band as described earlier in the context of other parameter sets.

The GOS parameter set syntax structure may include an identifier, which may be used when referring to a particular GOS parameter set instance for example from a slice header or another GOS parameter set. Alternatively, the GOS parameter set syntax structure does not include an identifier but an identifier may be inferred by both the encoder and decoder for example using the bitstream order of GOS parameter set syntax structures and a pre-defined numbering scheme.

The encoder and the decoder may infer the contents or the instance of GOS parameter set from other syntax structures already encoded or decoded or present in the bitstream. For example, the slice header of the texture view component of the base view may implicitly form a GOS parameter set. The encoder and decoder may infer an identifier value for such inferred GOS parameter sets. For example, the GOS parameter set formed from the slice header of the texture view component of the base view may be inferred to have identifier value equal to 0.

A GOS parameter set may be valid within a particular access unit associated with it. For example, if a GOS parameter set syntax structure is included in the NAL unit sequence for a particular access unit, where the sequence is in decoding or bitstream order, the GOS parameter set may be valid from its appearance location until the end of the access unit. Alternatively, a GOS parameter set may be valid for many access units.

The encoder may encode many GOS parameter sets for an access unit. The encoder may determine to encode a GOS parameter set if it is known, expected, or estimated that at least a subset of syntax element values in a slice header to be coded would be the same in a subsequent slice header.

A limited numbering space may be used for the GOS parameter set identifier. For example, a fixed-length code may be used and may be interpreted as an unsigned integer value of a certain range. The encoder may use a GOS parameter set identifier value for a first GOS parameter set and subsequently for a second GOS parameter set, if the first GOS parameter set is subsequently not referred to for example by any slice header or GOS parameter set. The encoder may repeat a GOS parameter set syntax structure within the bitstream for example to achieve a better robustness against transmission errors.

Syntax elements which may be included in a GOS parameter set may be conceptually collected in sets of syntax elements. A set of syntax elements for a GOS parameter set may be formed for example on one or more of the following basis:

Syntax elements indicating a scalable layer and/or other scalability features

Syntax elements indicating a view and/or other multiview features

Syntax elements related to a particular component type, such as depth/disparity

Syntax elements related to access unit identification, decoding order and/or output order and/or other syntax elements which may stay unchanged for all slices of an access unit Syntax elements which may stay unchanged in all slices of a view component Syntax elements related to reference picture list modification Syntax elements related to the reference picture set used Syntax elements related to decoding reference picture marking Syntax elements related to prediction weight tables for weighted prediction Syntax elements for controlling deblocking filtering Syntax elements for controlling adaptive loop filtering Syntax elements for controlling sample adaptive offset Any combination of sets above For each syntax element set, the encoder may have one or more of the following options when coding a GOS parameter set:

The syntax element set may be coded into a GOS parameter set syntax structure, i.e.

coded syntax element values of the syntax element set may be included in the GOS parameter set syntax structure.

The syntax element set may be included by reference into a GOS parameter set. The reference may be given as an identifier to another GOS parameter set. The encoder may use a different reference GOS parameter set for different syntax element sets.

The syntax element set may be indicated or inferred to be absent from the GOS parameter set.

The options from which the encoder is able to choose for a particular syntax element set when coding a GOS parameter set may depend on the type of the syntax element set. For example, a syntax element set related to scalable layers may always be present in a GOS parameter set, while the set of syntax elements which may stay unchanged in all slices of a view component may not be available for inclusion by reference but may be optionally present in the GOS parameter set and the syntax elements related to reference picture list modification may be included by reference in, included as such in, or be absent from a GOS parameter set syntax structure. The encoder may encode indications in the bitstream, for example in a GOS parameter set syntax structure, which option was used in encoding. The code table and/or entropy coding may depend on the type of the syntax element set. The decoder may use, based on the type of the syntax element set being decoded, the code table and/or entropy decoding that is matched with the code table and/or entropy encoding used by the encoder.

The encoder may have multiple means to indicate the association between a syntax element set and the GOS parameter set used as the source for the values of the syntax element set. For example, the encoder may encode a loop of syntax elements where each loop entry is encoded as syntax elements indicating a GOS parameter set identifier value used as a reference and identifying the syntax element sets copied from the reference GOP parameter set. In another example, the encoder may encode a number of syntax elements, each indicating a GOS parameter set. The last GOS parameter set in the loop containing a particular syntax element set is the reference for that syntax element set in the GOS parameter set the encoder is currently encoding into the bitstream. The decoder parses the encoded GOS parameter sets from the bitstream accordingly so as to reproduce the same GOS parameter sets as the encoder.

A header parameter set (HPS) was proposed in document JCTVC-J0109 (http://phenix.int-evry.fr/jct/doc_end_user/current_document.php?id=5972). An HPS is similar to GOS parameter set. A slice header is predicted from one or more HPSs. In other words, the values of slice header syntax elements can be selectively taken from one or more HPSs. If a picture consists of only one slice, the use of HPS is optional and a slice header can be included in the coded slice NAL unit instead. Two alternative approaches of the HPS design were proposed in JCTVC-J109: a single-AU HPS, where an HPS is applicable only to the slices within the same assess unit, and a multi-AU HPS, where an HPS may be applicable to slices in multiple access units. The two proposed approaches are similar in their syntax. The main differences between the two approaches arise from the fact that the single-AU HPS design requires transmission of an HPS for each access unit, while the multi-AU HPS design allows re-use of the same HPS across multiple AUs.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC, an access unit comprises a primary coded picture and those NAL units that are associated with it. In HEVC, an access unit is defined as a set of NAL units that are associated with each other according to a specified classification rule, are consecutive in decoding order, and contain exactly one coded picture. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit may be defined as a set of NAL units that are associated with each other according to a specified classification rule, are consecutive in decoding order, and contain exactly one coded picture. In addition to containing the VCL NAL units of the coded picture, an access unit may also contain non-VCL NAL units. In HEVC the decoding of an access unit results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In a draft HEVC standard, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from a BLA_W_DLP or a BLA_N_LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. The relative decoding order of the pictures is illustrated by the numerals inside the pictures. Any picture in the previous SOP has a smaller decoding order than any picture in the current SOP and any picture in the next SOP has a larger decoding order than any picture in the current SOP. The term group of pictures (GOP) may sometimes be used interchangeably with the term SOP and having the same semantics as the semantics of SOP rather than the semantics of closed or open GOP as described above.

The bitstream syntax of H.264/AVC indicates whether a particular picture is a reference picture, which may be used as a reference for inter prediction of any other picture. In H.264/AVC, the NAL unit header indicates the type of the NAL unit and whether a coded slice contained in the NAL unit is a part of a reference picture or a non-reference picture. In HEVC, there are two NAL unit types for many picture types (e.g. TRAIL_R, TRAIL_N), differentiated whether the picture may be used as reference for inter prediction in subsequent pictures in decoding order in the same sub-layer. Sub-layer non-reference picture (often denoted by _N in the picture type acronyms) may be defined as picture that contains samples that cannot be used for inter prediction in the decoding process of subsequent pictures of the same sub-layer in decoding order. Sub-layer non-reference pictures may be used as reference for pictures with a greater TemporalId value. Sub-layer reference picture (often denoted by _R in the picture type acronyms) may be defined as picture that may be used as reference for inter prediction in the decoding process of subsequent pictures of the same sub-layer in decoding order. Pictures of any coding type (I, P, B) can be reference pictures or non-reference pictures in H.264/AVC and HEVC. Slices within a picture may have different coding types.

Many hybrid video codecs, including H.264/AVC and HEVC, encode video information in two phases. In the first phase, predictive coding is applied for example as so-called sample prediction and/or as so-called syntax prediction. In the sample prediction, pixel or sample values in a certain picture area or "block" are predicted. These pixel or sample values can be predicted, for example, using one or more of the following ways:

- Motion compensation mechanisms (which may also be referred to as temporal prediction or motion-compensated temporal prediction or motion-compensated prediction or MCP), which involve finding and indicating an area in one of the previously encoded video frames that corresponds closely to the block being coded.
- Inter-view prediction, which involves finding and indicating an area in one of the previously encoded view components that corresponds closely to the block being coded.
- View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction, in which for example the coded residual of a reference layer or a derived residual from a difference of a reconstructed/decoded reference layer picture and a corresponding reconstructed/decoded enhancement layer picture may be used for predicting a residual block of the current enhancement layer block. A residual block may be added for example to a motion-compensated prediction block to obtain a final prediction block for the current enhancement layer block.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of a previously coded/decoded picture can be predicted. The reference index may be predicted from adjacent blocks and/or co-located blocks in temporal reference picture. Differential coding of motion vectors may be disabled across slice boundaries.

The block partitioning, e.g. from CTU to CUs and down to PUs, may be predicted.

In filter parameter prediction, the filtering parameters e.g. for sample adaptive offset may be predicted.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder may combine the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized for example using one or more of the following factors.

The Accuracy of Motion Vector Representation.

For example, motion vectors may be of quarter-pixel accuracy, half-pixel accuracy or full-pixel accuracy and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder. This block may also be referred to as a motion partition.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or co-located blocks in temporal reference picture. Differential coding of motion vectors may be disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated. The weights for explicit weighted prediction may be indicated for example in one or more of the following syntax structure: a slice header, a picture header, a picture parameter set, an adaptation parameter set or any similar syntax structure.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In some coding formats and codecs, a distinction is made between so-called short-term and long-term reference pictures.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

A syntax structure for decoded reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as a reference for the picture and all the reference pictures that are kept marked as "used for reference" for any subsequent pictures in decoding order. There are six subsets of the reference picture set, which are referred to as namely RefPicSetStCurr0 (which may also or alternatively referred to as RefPicSetStCurrBefore), RefPicSetStCurr1 (which may also or alternatively referred to as RefPicSetStCurrAfter), RefPicSetStFoll0, RefPicSetStFoll1, RefPicSetLtCurr, and RefPicSetLtFoll. In some HEVC draft specifications, RefPicSetStFoll0 and RefPicSetStFoll1 are regarded as one subset, which may be referred to as RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0 , RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices. However, in the final H.265/HEVC standard, no combined list is constructed.

A reference picture list, such as reference picture list 0 and reference picture list 1, may be constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The combined list in a draft HEVC standard may be constructed as follows. If the modification flag for the combined list is zero, the combined list is constructed by an implicit mechanism; otherwise it is constructed by reference picture combination commands included in the bitstream. In the implicit mechanism, reference pictures in List C are mapped to reference pictures from List 0 and List 1 in an interleaved fashion starting from the first entry of List 0, followed by the first entry of List 1 and so forth. Any reference picture that has already been mapped in List C is not mapped again. In the explicit mechanism, the number of entries in List C is signaled, followed by the mapping from an entry in List 0 or List 1 to each entry of List C. In addition, when List 0 and List 1 are identical the encoder has the option of setting the ref_pic_list_combination_flag to 0 to indicate that no reference pictures from List 1 are mapped, and that List C is equivalent to List 0.

Figure 8:
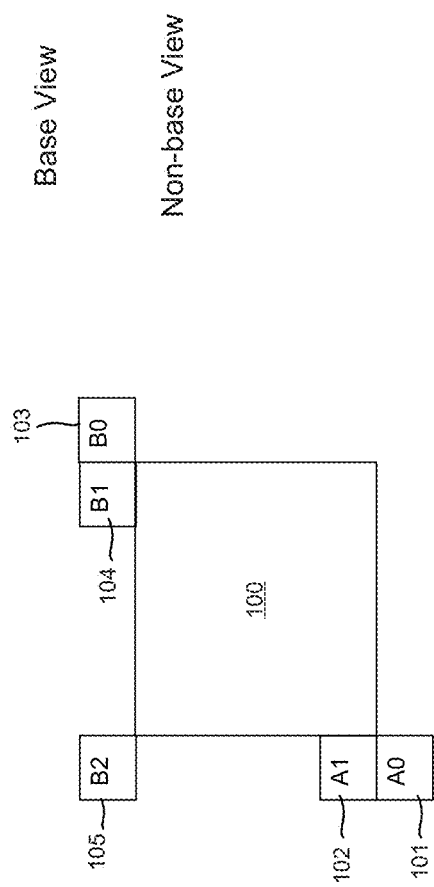
FIG. 8 depicts an example of a current block and five spatial neighbors usable as motion prediction candidates.

The advanced motion vector prediction (AMVP) may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 8: three spatial motion vector predictor candidate positions 103, 104, 105 located above the current prediction block 100 (B0, B1, B2) and two 101, 102 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

In addition to predicting the motion vector values, the reference index of previously coded/decoded picture can be predicted. The reference index may be predicted from adjacent blocks and/or from co-located blocks in a temporal reference picture.

Many high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list 1';2) Motion vector value corresponding to the reference picture list0, which may comprise a horizontal and vertical motion vector component; 3) Reference picture index in the reference picture list0 and/or an identifier of a reference picture pointed to by the Motion vector corresponding to reference picture list 0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list1.

Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)

a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);

a horizontal motion vector component (which may be indicated e.g. per prediction block or per reference index or alike);

a vertical motion vector component (which may be indicated e.g. per prediction block or per reference index or alike);

one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);

coordinates of a block to which the motion parameters and/or motion information applies, e.g. coordinates of the top-left sample of the block in luma sample units;

extents (e.g. a width and a height) of a block to which the motion parameters and/or motion information applies.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Inter-Picture Motion Vector Prediction and its Relation to Scalable Video Coding Multi-view coding has been realized as a multi-loop scalable video coding scheme, where the inter-view reference pictures are added into the reference picture lists. In MVC the inter-view reference components and inter-view only reference components that are included in the reference picture lists may be considered as not being marked as "used for short-term reference" or "used for long-term reference". In the derivation of temporal direct luma motion vector, the co-located motion vector may not be scaled if the picture order count difference of List 1 reference (from which the co-located motion vector is obtained) and List 0 reference is 0, i.e. if td is equal to 0 in FIG. 6c.

Figure 6A:
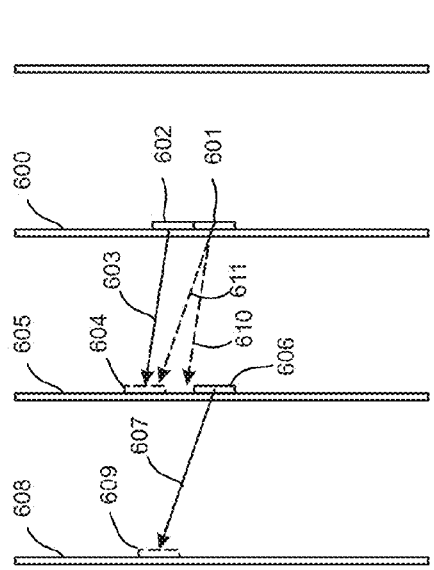
FIG. 6a illustrates an example of spatial and temporal prediction of a prediction unit.

FIG. 6a illustrates an example of spatial and temporal prediction of a prediction unit. There is depicted the current block 601 in the frame 600 and a neighbor block 602 which already has been encoded. A motion vector definer 362 (FIG. 4) has defined a motion vector 603 for the neighbor block 602 which points to a block 604 in the previous frame 605. This motion vector can be used as a potential spatial motion vector prediction 610 for the current block. FIG. 6a depicts that a co-located block 606 in the previous frame 605, i.e. the block at the same location than the current block but in the previous frame, has a motion vector 607 pointing to a block 609 in another frame 608. This motion vector 607 can be used as a potential temporal motion vector prediction 611 for the current block 601.

Figure 6B:
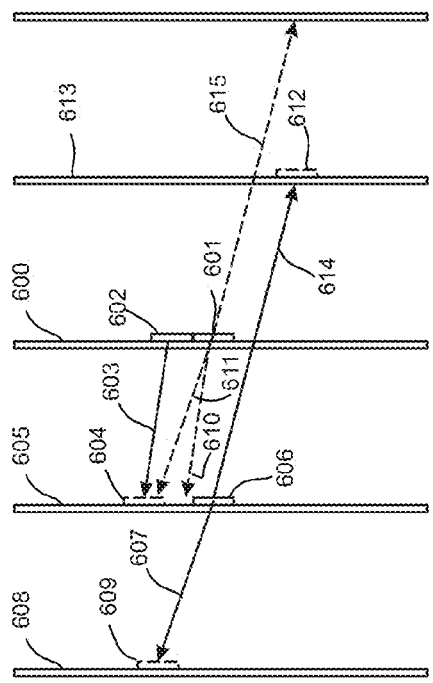
FIG. 6b illustrates another example of spatial and temporal prediction of a prediction unit.
Figure 6C:
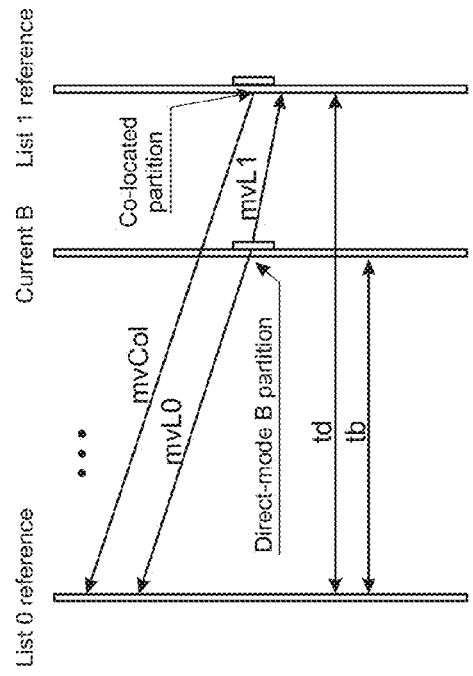
FIG. 6c depicts an example for direct-mode motion vector inference.

FIG. 6b illustrates another example of spatial and temporal prediction of a prediction unit. In this example the block 606 of the previous frame 605 uses bi-directional prediction based on the block 609 of the frame 608 preceding the frame 605 and on the block 612 in the frame 613 succeeding the current frame 600. The temporal motion vector prediction for the current block 601 may be formed by using both motion vectors 607, 614 or either of them.

In HEVC temporal motion vector prediction (TMVP), the reference picture list to be used for obtaining a collocated partition is chosen according to the collocated_from_l0_flag syntax element in the slice header. When the flag is equal to 1, it specifies that the picture that contains the collocated partition is derived from list 0, otherwise the picture is derived from list 1. When collocated_from_l0_flag is not present, it is inferred to be equal to 1. The collocated_ref_idx in the slice header specifies the reference index of the picture that contains the collocated partition. When the current slice is a P slice, collocated_ref_idx refers to a picture in list 0. When the current slice is a B slice, collocated_ref_idx refers to a picture in list 0 if collocated_from_l0 is 1, otherwise it refers to a picture in list 1. collocated_ref_idx always refers to a valid list entry, and the resulting picture is the same for all slices of a coded picture. When collocated_ref_idx is not present, it is inferred to be equal to 0.

In HEVC, when the current PU uses the merge mode, the target reference index for TMVP is set to 0 (for both reference picture list 0 and 1). In AMVP, the target reference index is indicated in the bitstream.

In HEVC, the availability of a candidate predicted motion vector (PMV) for the merge mode may be determined as follows (both for spatial and temporal candidates) (SRTP=short-term reference picture, LRTP=long-term reference picture)

| reference picture for target reference index | reference picture for candidate PMV | candidate PMV availability |
|---|---|---|
| STRP | STRP | "available" (and scaled) |
| STRP | LTRP | "unavailable" |
| LTRP | STRP | "unavailable" |
| LTRP | LTRP | "available" but not scaled |

Motion vector scaling may be performed in the case both target reference picture and the reference index for candidate PMV are short-term reference pictures. The scaling may be performed by scaling the motion vector with appropriate POC differences related to the candidate motion vector and the target reference picture relative to the current picture, e.g. with the POC difference of the current picture and the target reference picture divided by the POC difference of the current picture and the POC difference of the picture containing the candidate PMV and its reference picture.

Figure 9A:
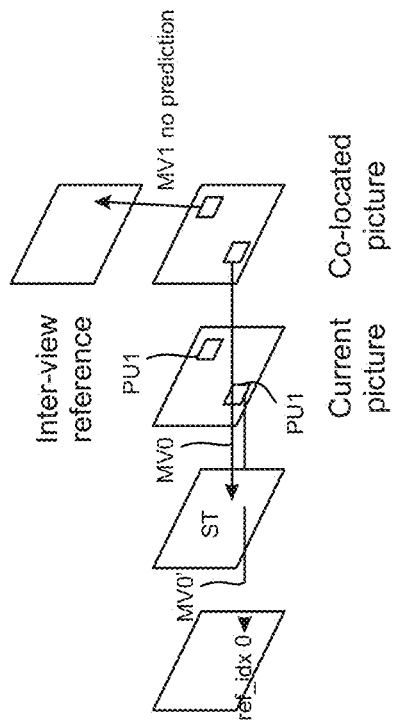
FIG. 9a illustrates operation of the HEVC merge mode for multiview video.

In FIG. 9a illustrating the operation of the HEVC merge mode for multiview video (e.g. MV-HEVC), the motion vector in the co-located PU, if referring to a short-term (ST) reference picture, is scaled to form a merge candidate of the current PU (PU0), wherein MV0 is scaled to MV0' during the merge mode. However, if the co-located PU has a motion vector (MV1) referring to an inter-view reference picture, marked as long-term, the motion vector is not used to predict the current PU (PU1), as the reference picture corresponding to reference index 0 is a short term reference picture and the reference picture of the candidate PMV is a long-term reference picture.

Figure 9B:
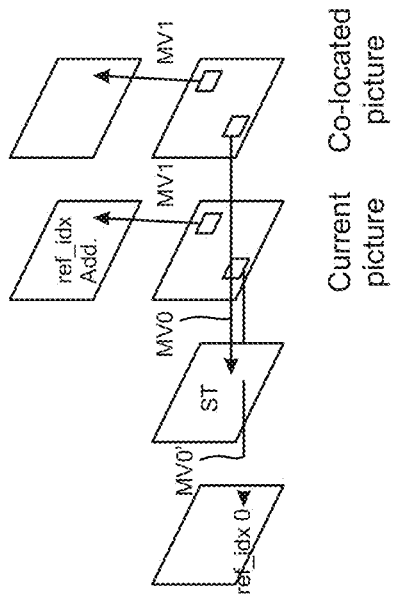
FIG. 9b illustrates operation of the HEVC merge mode for multiview video utilizing an additional reference index.

It has been proposed that a new additional reference index (ref_idx Add., also referred to as refIdxAdditional) may be derived so that the motion vectors referring to a long-term reference picture can be used to form a merge candidate and not considered as unavailable (when ref_idx 0 points to a short-term picture). If ref_idx 0 points to a short-term reference picture, refIdxAdditional is set to point to the first long-term picture in the reference picture list. Vice versa, if ref_idx 0 points to a long-term picture, refIdxAdditional is set to point to the first short-term reference picture in the reference picture list. refIdxAdditional is used in the merge mode instead of ref_idx 0 if its "type" (long-term or short-term) matches to that of the co-located reference index. An example of this is illustrated in FIG. 9b.

Scalable video coding refers to a coding structure where one bitstream can contain multiple representations of the content at different bitrates, resolutions and/or frame rates. In these cases the receiver can extract the desired representation depending on its characteristics (e.g. resolution that matches best with the resolution of the display of the device). Alternatively, a server or a network element can extract the portions of the bitstream to be transmitted to the receiver depending on e.g. the network characteristics or processing capabilities of the receiver.

A scalable bitstream may consist of a base layer providing the lowest quality video available and one or more enhancement layers that enhance the video quality when received and decoded together with the lower layers. An enhancement layer may enhance the temporal resolution (i.e., the frame rate), the spatial resolution, or simply the quality of the video content represented by another layer or part thereof. In order to improve coding efficiency for the enhancement layers, the coded representation of that layer may depend on the lower layers. For example, the motion and mode information of the enhancement layer can be predicted from lower layers. Similarly the pixel data of the lower layers can be used to create prediction for the enhancement layer(s).

Each scalable layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer, which may be referred to as inter-layer residual prediction.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

SVC allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL−1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref active_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

In an H.264/AVC bit stream, coded pictures in one coded video sequence uses the same sequence parameter set, and at any time instance during the decoding process, only one sequence parameter set is active. In SVC, coded pictures from different scalable layers may use different sequence parameter sets. If different sequence parameter sets are used, then, at any time instant during the decoding process, there may be more than one active sequence picture parameter set. In the SVC specification, the one for the top layer is denoted as the active sequence picture parameter set, while the rest are referred to as layer active sequence picture parameter sets. Any given active sequence parameter set remains unchanged throughout a coded video sequence in the layer in which the active sequence parameter set is referred to.

As indicated earlier, MVC is an extension of H.264/AVC.

Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

As mentioned earlier, non-base views of MVC bitstreams may refer to a subset sequence parameter set NAL unit. A subset sequence parameter set for MVC includes a base SPS data structure and a sequence parameter set MVC extension data structure. In MVC, coded pictures from different views may use different sequence parameter sets. An SPS in MVC (specifically the sequence parameter set MVC extension part of the SPS in MVC) can contain the view dependency information for inter-view prediction. This may be used for example by signaling-aware media gateways to construct the view dependency tree.

In the context of multiview video coding, view order index may be defined as an index that indicates the decoding or bitstream order of view components in an access unit. In MVC, the inter-view dependency relationships are indicated in a sequence parameter set MVC extension, which is included in a sequence parameter set. According to the MVC standard, all sequence parameter set MVC extensions that are referred to by a coded video sequence are required to be identical. The following excerpt of the sequence parameter set MVC extension provides further details on the way inter-view dependency relationships are indicated in MVC.

|  | C | Descriptor |
|---|---|---|
| seq_parameter_set_mvc_extension( ) { | | |
|   num_views_minus1 | 0 | ue(v) |
|   for( i = 0; i <= num_views_minus1; i++ ) | | |
|     view_id[ i ] | 0 | ue(v) |
|   for( i = 1; i <= num_views_minus1; i++ ) { | | |
|     num_anchor_refs_l0[ i ] | 0 | ue(v) |
|     for( j = 0; j < num_anchor_refs_l0[ i ]; j++ ) | | |
|       anchor_ref_l0[ i ][ j ] | 0 | ue(v) |
|     num_anchor_refs_l1[ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i <= num_views_minus1; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
| . . . | | |

In MVC decoding process, the variable VOIdx may represent the view order index of the view identified by view_id (which may be obtained from the MVC NAL unit header of the coded slice being decoded) and may be set equal to the value of i for which the syntax element view_id[i] included in the referred subset sequence parameter set is equal to view_id.

The semantics of the sequence parameter set MVC extension may be specified as follows. num_views_minus1 plus 1 specifies the maximum number of coded views in the coded video sequence. The actual number of views in the coded video sequence may be less than num_views_minus1 plus 1. view_id[i] specifies the view_id of the view with VOIdx equal to i. num_anchor_refs_l0[i] specifies the number of view components for inter-view prediction in the initial reference picture list RefPicList0 in decoding anchor view components with VOIdx equal to i. anchor_ref_l0[i][j] specifies the view_id of the j-th view component for inter-view prediction in the initial reference picture list RefPicList0 in decoding anchor view components with VOIdx equal to i. num_anchor_refs_l1[i] specifies the number of view components for inter-view prediction in the initial reference picture list RefPicList1 in decoding anchor view components with VOIdx equal to i. anchor_ref_l1[i][j] specifies the view_id of the j-th view component for inter-view prediction in the initial reference picture list RefPicList1 in decoding an anchor view component with VOIdx equal to i. num_non_anchor_refs_l0[i] specifies the number of view components for inter-view prediction in the initial reference picture list RefPicList0 in decoding non-anchor view components with VOIdx equal to i. non_anchor_ref_l0[i][j] specifies the view_id of the j-th view component for inter-view prediction in the initial reference picture list RefPicList0 in decoding non-anchor view components with VOIdx equal to i. num_non_anchor_refs_l1[i] specifies the number of view components for inter-view prediction in the initial reference picture list RefPicList1 in decoding non-anchor view components with VOIdx equal to i. non_anchor_ref_l1[i][j] specifies the view_id of the j-th view component for inter-view prediction in the initial reference picture list RefPicList1 in decoding non-anchor view components with VOIdx equal to i. For any particular view with view_id equal to vId1 and VOIdx equal to vOIdx1 and another view with view_id equal to vId2 and VOIdx equal to vOIdx2, when vId2 is equal to the value of one of non_anchor_ref_l0[vOIdx1][j] for all j in the range of 0 to num_non_anchor_refs_l0[vOIdx1], exclusive, or one of non_anchor_ref_l1[vOIdx1][j] for all j in the range of 0 to num_non_anchor_refs_l1[vOIdx1], exclusive, vId2 is also required to be equal to the value of one of anchor_ref_l0[vOIdx1][j] for all j in the range of 0 to num_anchor_refs_l0[vOIdx1], exclusive, or one of anchor_ref_l1[vOIdx1][j] for all j in the range of 0 to num_anchor_refs_l1[vOIdx1], exclusive. The inter-view dependency for non-anchor view components is a subset of that for anchor view components.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

In SVC and MVC, a prefix NAL unit may be defined as a NAL unit that immediately precedes in decoding order a VCL NAL unit for base layer/view coded slices. The NAL unit that immediately succeeds the prefix NAL unit in decoding order may be referred to as the associated NAL unit. The prefix NAL unit contains data associated with the associated NAL unit, which may be considered to be part of the associated NAL unit. The prefix NAL unit may be used to include syntax elements that affect the decoding of the base layer/view coded slices, when SVC or MVC decoding process is in use. An H.264/AVC base layer/view decoder may omit the prefix NAL unit in its decoding process. A prefix NAL unit could likewise be specified for other NAL-unit structured streams, such as HEVC. Similarly to prefix NAL units, suffix NAL units may be specified and a suffix NAL unit may apply to the NAL unit preceding it in bitstream or decoding order.

In scalable multiview coding, the same bitstream may contain coded view components of multiple views and at least some coded view components may be coded using quality and/or spatial scalability.

There are ongoing standardization activities for depth-enhanced video coding where both texture views and depth views are coded.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

Ranging information for a particular view represents distance information of a texture sample from the camera sensor, disparity or parallax information between a texture sample and a respective texture sample in another view, or similar information.

Ranging information of real-word 3D scene depends on the content and may vary for example from 0 to infinity. Different types of representation of such ranging information can be utilized.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

1. Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity.

2. Each luma sample value in a coded depth view component represents an inverse of real-world distance (Z) value, i.e. 1/Z, which is mapped to the dynamic range of the luma samples, such as to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such as to the range of 0 to 255, inclusive, for 8-bit luma representation.
4. Each luma sample value in a coded depth view component represents a disparity or parallax value from the present depth view to another indicated or derived depth view or view position.

The semantics of depth map values may be indicated in the bitstream for example within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values. Phrases depth view component and depth picture may be used interchangeably and may have the same semantics in many embodiments.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in a SEI message.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form of a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Depth-enhanced video formats enable generation of virtual views or pictures at camera positions that are not represented by any of the coded views. Generally, any depth-image-based rendering (DIBR) algorithm may be used for synthesizing views.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

An amendment has been specified for the H.264/AVC for depth map coding. The amendment is called MVC extension for inclusion of depth maps and may be referred to as MVC+D. The MVC+D amendment specifies the encapsulation of texture views and depth views into the same bitstream in a manner that the texture views remain compatible with H.264/AVC and MVC so that an MVC decoder is able to decode all texture views of an MVC+D bitstream and an H.264/AVC decoder is able to decode the base texture view of an MVC+D bitstream. Furthermore, the VCL NAL units of the depth view use identical syntax, semantics, and decoding process to those of texture views below the NAL unit header.

Development of another amendment for the H.264/AVC is ongoing at the time of writing this patent application. This amendment, referred to as 3D-AVC, requires at least one texture view to be H.264/AVC compatible while further texture views may be (but need not be) MVC compatible.

An encoder that encodes one or more texture and depth views into a single H.264/AVC and/or MVC compatible bitstream may be called as a 3DV-ATM encoder. Bitstreams generated by such an encoder may be referred to as 3DV-ATM bitstreams and may be either MVC+D bitstreams or 3D-AVC bitstreams. The texture views of 3DV-ATM bitstreams are compatible with H.264/AVC (for the base view) and may be compatible with MVC (always in the case of MVC+D bitstreams and as selected by the encoder in 3D-AVC bitstreams). The depth views of 3DV-ATM bitstreams may be compatible with MVC+D (always in the case of MVC+D bitstreams and as selected by the encoder in 3D-AVC bitstreams). 3D-AVC bitstreams can include a selected number of AVC/MVC compatible texture views. Furthermore, 3DV-ATM bitstream3D-AVC bitstreams can include a selected number of depth views that are coded using the coding tools of the AVC/MVC standard only. The other texture views (a.k.a. enhanced texture views) of an 3DV-ATM3D-AVC bitstream may be jointly predicted from the texture and depth views and/or the other depth views of an 3D-AVC bitstream may use depth coding methods not included in the AVC/MVC/MVC+D standard presently. A decoder capable of decoding all views from 3DV-ATM bitstreams may be called as a 3DV-ATM decoder.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

In some depth-enhanced video coding and bitstreams, such as MVC+D, depth views may refer to a differently structured sequence parameter set, such as a subset SPS NAL unit, than the sequence parameter set for texture views. For example, a sequence parameter set for depth views may include a sequence parameter set 3D video coding (3DVC) extension. When a different SPS structure is used for depth-enhanced video coding, the SPS may be referred to as a 3D video coding (3DVC) subset SPS or a 3DVC SPS, for example. From the syntax structure point of view, a 3DVC subset SPS may be a superset of an SPS for multiview video coding such as the MVC subset SPS.

A depth-enhanced multiview video bitstream, such as an MVC+D bitstream, may contain two types of operation points: multiview video operation points (e.g. MVC operation points for MVC+D bitstreams) and depth-enhanced operation points. Multiview video operation points consisting of texture view components only may be specified by an SPS for multiview video, for example a sequence parameter set MVC extension included in an SPS referred to by one or more texture views. Depth-enhanced operation points may be specified by an SPS for depth-enhanced video, for example a sequence parameter set MVC or 3DVC extension included in an SPS referred to by one or more depth views.

A depth-enhanced multiview video bitstream may contain or be associated with multiple sequence parameter sets, e.g. one for the base texture view, another one for the non-base texture views, and a third one for the depth views. For example, an MVC+D bitstream may contain one SPS NAL unit (with an SPS identifier equal to e.g. 0), one MVC subset SPS NAL unit (with an SPS identifier equal to e.g. 1), and one 3DVC subset SPS NAL unit (with an SPS identifier equal to e.g. 2). The first one is distinguished from the other two by NAL unit type, while the latter two have different profiles, i.e., one of them indicates an MVC profile and the other one indicates an MVC+D profile.

The coding and decoding order of texture view components and depth view components may be indicated for example in a sequence parameter set.

The depth representation information SEI message of a draft MVC+D standard (JCT-3V document JCT2-A1001), presented in the following, may be regarded as an example of how information about depth representation format may be represented. The syntax of the SEI message is as follows:

|  | C | Descriptor |
|---|---|---|
| depth_represention_information( payloadSize ) { | | |
|     depth_representation_type | 5 | ue(v) |
|     all_views_equal_flag | 5 | u(1) |
|     if( all_views_equal_flag == 0 ) { | | |
|         num_views_minus1 | 5 | ue(v) |
|         numViews = num_views_minus1 + 1 | | |
|     }else{ | | |
|         numViews = 1 | | |
|     } | | |
|     for( i = 0; i < numViews; i++ ) { | | |
|         depth_representation_base_view_id[i] | 5 | ue(v) |
|     } | | |
|     if ( depth_representation_type == 3 ) { | | |
|         depth_nonlinear_representation_num_minus1 | | ue(v) |
|         depth_nonlinear_representation_num = | | |
|             depth_nonlinear_representation_num_minus1+1 | | |
|         for( i = 1; i <= depth_nonlinear_representation_num; i++ ) | | |
|             depth_nonlinear_representation_model[ i ] | | ue(v) |
|     } | | |
| } | | |

The semantics of the depth representation SEI message may be specified as follows. The syntax elements in the depth representation information SEI message specifies various depth representation for depth views for the purpose of processing decoded texture and depth view components prior to rendering on a 3D display, such as view synthesis. It is recommended, when present, the SEI message is associated with an IDR access unit for the purpose of random access. The information signaled in the SEI message applies to all the access units from the access unit the SEI message is associated with to the next access unit, in decoding order, containing an SEI message of the same type, exclusively, or to the end of the coded video sequence, whichever is earlier in decoding order.

Continuing the exemplary semantics of the depth representation SEI message, depth_representation_type specifies the representation definition of luma pixels in coded frame of depth views as specified in the table below. In the table below, disparity specifies the horizontal displacement between two texture views and Z value specifies the distance from a camera.

| depth_representation_type | Interpretation |
| --- | --- |
| 0 | Each luma pixel value in coded frame of depth views represents an inverse of Z value normalized in range from 0 to 255 |
| 1 | Each luma pixel value in coded frame of depth views represents disparity normalized in range from 0 to 255 |
| 2 | Each luma pixel value in coded frame of depth views represents Z value normalized in range from 0 to 255 |
| 3 | Each luma pixel value in coded frame of depth views represents nonlinearly mapped disparity, normalized in range from 0 to |

Continuing the exemplary semantics of the depth representation SEI message, all_views_equal_flag equal to 0 specifies that depth representation base view may not be identical to respective values for each view in target views. all_views_equal_flag equal to 1 specifies that the depth representation base views are identical to respective values for all target views. depth_representaion_base_view_id[i] specifies the view identifier for the NAL unit of either base view which the disparity for coded depth frame of i-th view_id is derived from (depth_representation_type equal to 1 or 3) or base view which the Z-axis for the coded depth frame of i-th view_id is defined as the optical axis of (depth_representation_type equal to 0 or 2). depth_nonlinear_representation_num_minus1+2 specifies the number of piecewise linear segments for mapping of depth values to a scale that is uniformly quantized in terms of disparity. depth_nonlinear_representation_model[i] specifies the piecewise linear segments for mapping of depth values to a scale that is uniformly quantized in terms of disparity. When depth_representation_type is equal to 3, depth view component contains nonlinearly transformed depth samples. Variable DepthLUT [i], as specified below, is used to transform coded depth sample values from nonlinear representation to the linear representation—disparity normalized in range from 0 to 255. The shape of this transform is defined by means of line-segment-approximation in two-dimensional linear-disparity-to-nonlinear-disparity space. The first (0, 0) and the last (255, 255) nodes of the curve are predefined. Positions of additional nodes are transmitted in form of deviations (depth_nonlinear_representation_model [i]) from the straight-line curve. These deviations are uniformly distributed along the whole range of 0 to 255, inclusive, with spacing depending on the value of nonlinear_depth_representation_num.

Variable DepthLUT[i] for i in the range of 0 to 255, inclusive, is specified as follows.

```
depth_nonlinear_representation_model[ 0 ] = 0
  depth_nonlinear_representation_model
    [depth_nonlinear_representation_num + 1 ] = 0
  for( k=0; k<= depth_nonlinear_representation_num; ++k )
  {
    pos1 = ( 255 * k ) / (depth_nonlinear_representation_num + 1 )
    dev1 = depth_nonlinear_representation_model[ k ]
    pos2 = ( 255 * ( k+1 ) ) /
        (depth_nonlinear_representation_num + 1 ) )
    dev2 = depth_nonlinear_representation_model[ k+1 ]
    x1 = pos1 − dev1
    y1 = pos1 + dev1
    x2 = pos2 − dev2
    y2 = pos2 + dev2
    for ( x = max( x1, 0 ); x <= min( x2, 255 ); ++x )
        DepthLUT[ x ] = Clip3( 0, 255, Round( ( ( x − x1 ) *
            ( y2 − y1 ) ) ÷ ( x2 − x1 ) + y1 ) )
  }
```

In a scheme referred to as unpaired multiview video-plus-depth (MVD), there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

Terms co-located, collocated, and overlapping may be used interchangeably to indicate that a certain sample or area in a texture view component represents the same physical objects or fragments of a 3D scene as a certain co-located/collocated/overlapping sample or area in a depth view component. In some embodiments, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component. In some embodiments, sample dimensions (twidth×theight) of a sampling grid of a component image, such as a luma image, of a texture view component may be an integer multiple of sample dimensions (dwidth×dheight) of a sampling grid of a depth view component, i.e. twidth=m×dwidth and theight=n×dheight, where m and n are positive integers. In some embodiments, dwidth=m× twidth and dheight=n×theight, where m and n are positive integers. In some embodiments, twidth=m×dwidth and theight=n×dheight or alternatively dwidth=m×twidth and dheight=n×theight, where m and n are positive values and may be non-integer. In these embodiments, an interpolation scheme may be used in the encoder and in the decoder and in the view synthesis process and other processes to derive co-located sample values between texture and depth. In some embodiments, the physical position of a sampling grid of a component image, such as a luma image, of a texture view component may match that of the corresponding depth view and the sample dimensions of a component image, such as a luma image, of the texture view component may be an integer multiple of sample dimensions (dwidth× dheight) of a sampling grid of the depth view component (or vice versa)—then, the texture view component and the depth view component may be considered to be co-located and represent the same viewpoint. In some embodiments, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only and origo in the top-left corner. In some embodiments, the values of x and/or y may be non-integer and consequently an interpolation scheme may be used in the encoder and in the decoder and in the view synthesis process and other processes to derive co-located sample values between texture and depth. In some embodiments, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component. In some embodiments, non-uniform and/or non-matching sample grids can be utilized for texture and/or depth component. A sample grid of depth view component is non-matching with the sample grid of a texture view component when the sampling grid of a component image, such as a luma image, of the texture view component is not an integer multiple of sample dimensions (dwidth×dheight) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This could happen for example on purpose to reduce redundancy of data in one of the components or due to inaccuracy of the calibration/rectification process between a depth sensor and a color image sensor.

A coded depth-enhanced video bitstream, such as an MVC+D bitstream or an 3D-AVC bitstream, may be considered to include different types of operation points: texture video operation points, such as MVC operation points, texture-plus-depth operation points including both texture views and depth views, and depth video operation points including only depth views. An MVC operation point comprises texture view components as specified by the SPS MVC extension. The texture plus depth operation points may be paired or unpaired. In paired texture-plus-depth operation points, each view contains both a texture depth and a depth view (if both are defined in the 3DVC subset SPS by the same syntax structure as that used in the SPS MVC extension. originally present in the bitstream). In unpaired texture-plus-depth operation points, it is specified whether a texture view or a depth view or both are present in the operation point for a particular view.

The coding and/or decoding order of texture view components and depth view components may determine presence of syntax elements related to inter-component prediction and allowed values of syntax elements related to inter-component prediction.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use similar motion-compensated prediction process. Inter-view reference pictures and inter-view only reference pictures are essentially treated as long-term reference pictures in the different prediction processes. Similarly, view synthesis prediction may be realized in such a manner that it uses essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

As reference picture lists in MVC and an envisioned coding scheme for MVD such as 3DV-ATM and in similar coding schemes may contain more than one type of reference pictures, such as inter reference pictures (also known as intra-view reference pictures), inter-view reference pictures, inter-view only reference pictures, and/or VSP reference pictures, a term prediction direction may be defined to indicate the use of intra-view reference pictures (temporal prediction), inter-view prediction, or VSP. For example, an encoder may choose for a specific block a reference index that points to an inter-view reference picture, thus the prediction direction of the block is inter-view.

A VSP reference picture may also be referred to as a synthetic reference component, which may be defined to contain samples that may be used for view synthesis prediction. A synthetic reference component may be used as a reference picture for view synthesis prediction but may not be output or displayed. A view synthesis picture may be generated for the same camera location assuming the same camera parameters as for the picture being coded or decoded.

A view-synthesized picture may be introduced in the reference picture list in a similar way as is done with inter-view reference pictures. Signaling and operations with reference picture list in the case of view synthesis prediction may remain identical or similar to those specified in H.264/AVC or HEVC.

A synthesized picture resulting from VSP may be included in the initial reference picture lists List0 and List1 for example following temporal and inter-view reference frames. However, reference picture list modification syntax (i.e., RPLR commands) may be extended to support VSP reference pictures, thus the encoder can order reference picture lists at any order, indicate the final order with RPLR commands in the bitstream, causing the decoder to reconstruct the reference picture lists having the same final order.

Processes for predicting from view synthesis reference picture, such as motion information derivation, may remain identical or similar to processes specified for inter, inter-layer, and inter-view prediction of H.264/AVC or HEVC. Alternatively or in addition, specific coding modes for the view synthesis prediction may be specified and signaled by the encoder in the bitstream. In other words, VSP may alternatively or also be used in some encoding and decoding arrangements as a separate mode from intra, inter, inter-view and other coding modes. For example, in a VSP skip/direct mode the motion vector difference (de)coding and the (de)coding of the residual prediction error for example using transform-based coding may also be omitted. For example, if a macroblock may be indicated within the bitstream to be coded using a skip/direct mode, it may further be indicated within the bitstream whether a VSP frame is used as a reference. Alternatively or in addition, view-synthesized reference blocks, rather than or in addition to complete view synthesis reference pictures, may be generated by the encoder and/or the decoder and used as prediction reference for various prediction processes.

To enable view synthesis prediction for the coding of the current texture view component, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

A coding scheme for unpaired MVD may for example include one or more of the following aspects:
a. Encoding one or more indications of which ones of the input texture and depth views are encoded, inter-view prediction hierarchy of texture views and depth views, and/or AU view component order into a bitstream.
b. As a response of a depth view required as a reference or input for prediction (such as view synthesis prediction, inter-view prediction, inter-component prediction, and/or alike) and/or for view synthesis performed as post-processing for decoding and the depth view not input to the encoder or determined not to be coded, performing the following:
  Deriving the depth view, one or more depth view components for the depth view, or parts of one or more depth view components for the depth view on the basis of coded depth views and/or coded texture views and/or reconstructed depth views and/or reconstructed texture views or parts of them. The derivation may be based on view synthesis or DIBR, for example.
  Using the derived depth view as a reference or input for prediction (such as view synthesis prediction, inter-view prediction, inter-component prediction, and/or alike) and/or for view synthesis performed as post-processing for decoding.
c. Inferring the use of one or more coding tools, modes of coding tools, and/or coding parameters for coding a texture view based on the presence or absence of a respective coded depth view and/or the presence or absence of a respective derived depth view. In some embodiments, when a depth view is required as a reference or input for prediction (such as view synthesis prediction, inter-view prediction, inter-component prediction, and/or alike) but is not encoded, the encoder may derive the depth view; or
  infer that coding tools causing a depth view to be required as a reference or input for prediction are turned off; or
  select one of the above adaptively and encode the chosen option and related parameter values, if any, as one or more indications into the bitstream.
d. Forming an inter-component prediction signal or prediction block or alike from a depth view component (or, generally from one or more depth view components) to a texture view component (or, generally to one or more texture view components) for a subset of predicted blocks in a texture view component on the basis of availability of co-located samples or blocks in a depth view component. Similarly, forming an inter-component prediction signal or a prediction block or alike from a texture view component (or, generally from one or more texture view components) to a depth view component (or, generally to one or more depth view components) for a subset of predicted blocks in a depth view component on the basis of availability of co-located samples or blocks in a texture view component.
e. Forming a view synthesis prediction signal or a prediction block or alike for a texture block on the basis of availability of co-located depth samples.

A decoding scheme for unpaired MVD may for example include one or more of the following aspects:
a. Receiving and decoding one or more indications of coded texture and depth views, inter-view prediction hierarchy of texture views and depth views, and/or AU view component order from a bitstream.
b. When a depth view required as a reference or input for prediction (such as view synthesis prediction, inter-view prediction, inter-component prediction, and/or alike) but not included in the received bitstream,
  deriving the depth view; or
  inferring that coding tools causing a depth view to be required as a reference or input for prediction are turned off; or
  selecting one of the above based on one or more indications received and decoded from the bitstream.
c. Inferring the use of one or more coding tools, modes of coding tools, and/or coding parameters for decoding a texture view based on the presence or absence of a respective coded depth view and/or the presence or absence of a respective derived depth view.
d. Forming an inter-component prediction signal or prediction block or alike from a depth view component (or, generally from one or more depth view components) to a texture view component (or, generally to one or more texture view components) for a subset of predicted blocks in a texture view component on the basis of availability of co-located samples or blocks in a depth view component. Similarly, forming an inter-component prediction signal or prediction block or alike from a texture view component (or, generally from one or more texture view components) to a depth view component (or, generally to one or more depth view components) for a subset of predicted blocks in a depth view component on the basis of availability of co-located samples or blocks in a texture view component.
e. Forming a view synthesis prediction signal or prediction block or alike on the basis of availability of co-located depth samples.
f. When a depth view required as a reference or input for prediction for view synthesis performed as post-processing, deriving the depth view.
g. Determining view components that are not needed for decoding or output on the basis of mentioned signalling and configuring the decoder to avoid decoding these unnecessary coded view components.

Video compression is commonly achieved by removing spatial, frequency, and/or temporal redundancies. Different types of prediction and quantization of transform-domain prediction residuals may be used to exploit both spatial and temporal redundancies. In addition, as coding schemes have a practical limit in the redundancy that can be removed, spatial and temporal sampling frequency as well as the bit depth of samples can be selected in such a manner that the subjective quality is degraded as little as possible.

One potential way for obtaining compression improvement in stereoscopic video is an asymmetric stereoscopic video coding, in which there is a quality difference between two coded views. This is attributed to the widely believed assumption of the binocular suppression theory that the Human Visual System (HVS) fuses the stereoscopic image pair such that the perceived quality is close to that of the higher quality view.

Asymmetry between the two views can be achieved e.g. by one or more of the following methods:

Mixed-resolution (MR) stereoscopic video coding, which may also be referred to as resolution-asymmetric stereoscopic video coding, in which one of the views is low-pass filtered and hence has a smaller amount of spatial details or a lower spatial resolution. Furthermore, the low-pass filtered view may be sampled with a coarser sampling grid, i.e., represented by fewer pixels.

Mixed-resolution chroma sampling, in which the chroma pictures of one view are represented by fewer samples than the respective chroma pictures of the other view.

Asymmetric sample-domain quantization, in which the sample values of the two views are quantized with a different step size. For example, the luma samples of one view may be represented with the range of 0 to 255 (i.e., 8 bits per sample) while the range may be scaled e.g. to the range of 0 to 159 for the second view. Thanks to fewer quantization steps, the second view can be compressed with a higher ratio compared to the first view. Different quantization step sizes may be used for luma and chroma samples. As a special case of asymmetric sample-domain quantization, one can refer to bit-depth-asymmetric stereoscopic video when the number of quantization steps in each view matches a power of two.

Asymmetric transform-domain quantization, in which the transform coefficients of the two views are quantized with a different step size. As a result, one of the views has a lower fidelity and may be subject to a greater amount of visible coding artifacts, such as blocking and ringing.

A combination of different encoding techniques above may also be used.

Figure 10:
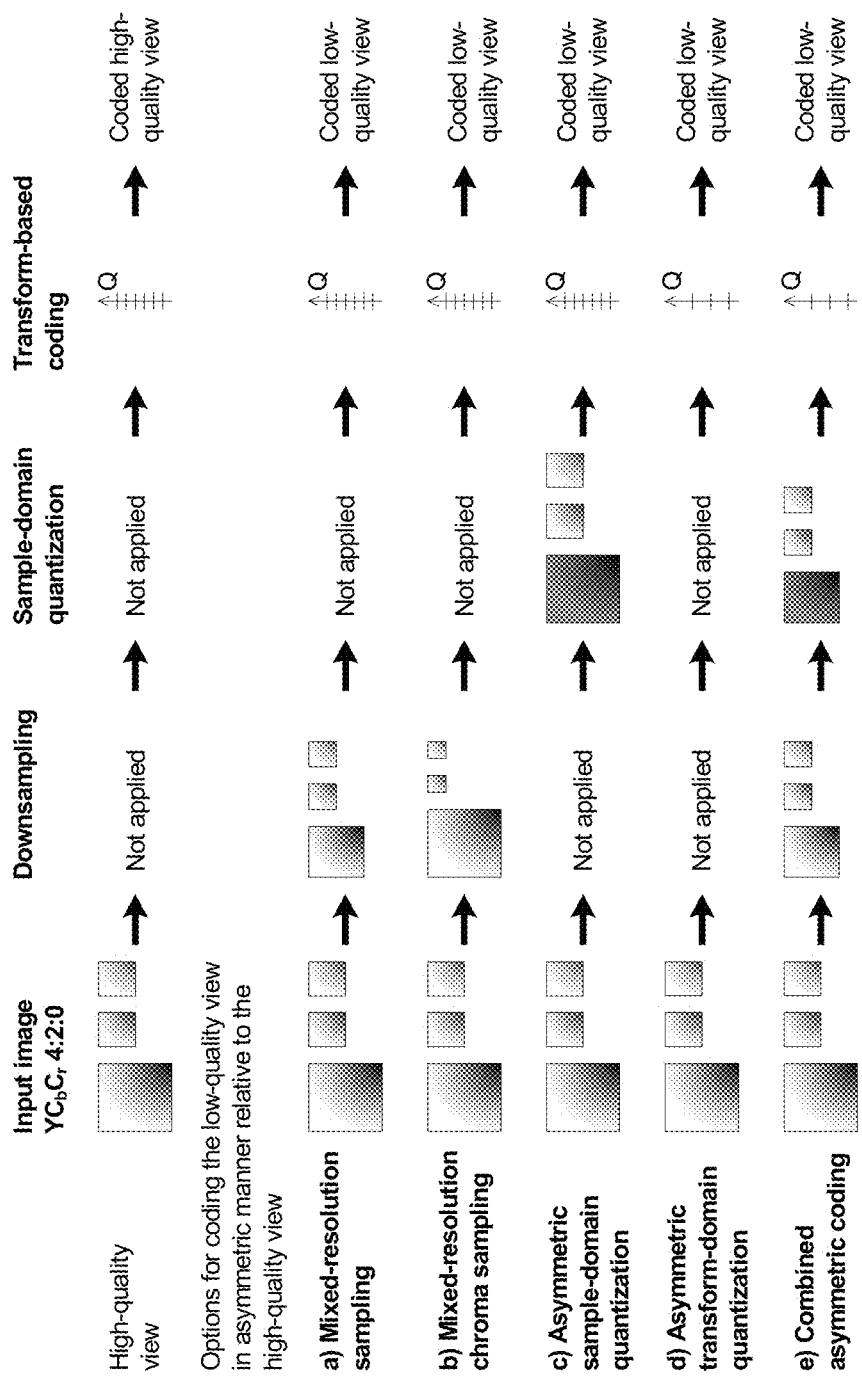
FIG. 10 depicts some examples of asymmetric stereoscopic video coding types.

The aforementioned types of asymmetric stereoscopic video coding are illustrated in FIG. 10. The first row (12a) presents the higher quality view which is only transform-coded. The remaining rows (12b-12e) present several encoding combinations which have been investigated to create the lower quality view using different steps, namely, downsampling, sample domain quantization, and transform based coding. It can be observed from the figure that downsampling or sample-domain quantization can be applied or skipped regardless of how other steps in the processing chain are applied. Likewise, the quantization step in the transform-domain coding step can be selected independently of the other steps. Thus, practical realizations of asymmetric stereoscopic video coding may use appropriate techniques for achieving asymmetry in a combined manner as illustrated in FIG. 12e.

In addition to the aforementioned types of asymmetric stereoscopic video coding, mixed temporal resolution (i.e., different picture rate) between views may also be used.

In multiview video coding, motion vectors of different views may be quite correlated as the views are captured from cameras that are slightly apart each other. Therefore, utilizing motion data of one view for coding the other view may improve the coding efficiency of a multiview video coder.

Multiview video coding may be realized in many ways. For example, multiview video coding may be realized by only introducing high level syntax changes to a single layer video coder without any changes below the macroblock (or coding tree block) layer. In this high-level only multiview video coder, the decoded pictures from different views may be placed in the decoded picture buffer (DPB) of other views and treated as a regular reference picture.

Temporal motion vector prediction process may be used to exploit the redundancy of motion data between different layers. This may be done as follows: when the base layer is upsampled the motion data of the base layer is also mapped to the resolution of an enhancement layer. If the enhancement layer picture utilizes temporal motion vector prediction from the base layer picture, the corresponding motion vector predictor is originated from the mapped base layer motion field. This way the correlation between the motion data of different layers may be exploited to improve the coding efficiency of a scalable video coder.

This kind of motion mapping process may be useful for mapping motion fields between layers of different resolutions, but may not work for multi-view video coding.

In an inter-view motion skip or prediction mode for multi-view video coding correlations of motion data existing between different views may be exploited. If this mode is enabled, motion data of the corresponding block may be calculated using the motion information from a different view. This calculation may involve first finding the corresponding motion blocks in another view due to disparity, and performing a pre-defined operation on the corresponding motion blocks. Due to the new mode, this approach may not be suitable for a high-level syntax only multi-view video coder.

It may also be possible to use motion of one view to predict motion of another view by establishing a correspondence between a block in one view and a block in a reference view. This may be done by estimating a depth map, either based on already transmitted depth data or by using transmitted disparity vectors. Establishing the correspondence may be implemented in a high-level syntax only coder.

Different measure may be derived from a block of depth samples $cb\_d$, some of which are presented in the following. The depth/disparity information can be aggregatively presented through average depth/disparity values for $cb\_d$ and deviation (e.g. variance) of $cb\_d$. The average $Av(cb\_d)$ depth/disparity value for a block of depth information $cb\_d$ may be computed as:

$$Av(cb\_d)=\text{sum}(cb\_d(x,y))/\text{num\_pixels} \quad (4)$$

where x and y are coordinates of the pixels in $cb\_d$, and num_pixels is number of pixels within $cb\_d$, and function sum adds up all the sample/pixel values in the given block, i.e. function sum(block(x,y)) computes a sum of samples values within the given block for all values of x and y corresponding to the horizontal and vertical extents of the block.

The deviation $Dev(cb\_d)$ of the depth/disparity values within a block of depth information $cb\_d$ can be computed as:

$$Dev(cb\_d)=\text{sum}(\text{abs}(cb\_d(x,y)-Av(cb\_d)))/\text{num\_pixels} \quad (5)$$

where function abs returns the absolute value of the value given as input.

The following may be used to determine if a block of depth data $cb\_d$ represents homogenous:

$$\text{If } Dev(cb\_d)=<T1, cb\_d=\text{homogenous data} \quad (6)$$

where T1 may be an application-specific predefined threshold T1 and/or may be indicated by the encoder in the bitstream. In other words, if the deviation of the depth/disparity values within a block of depth information cb_d is less than or equal than the threshold T1, such cb_d block can be considered as homogenous.

The similarity of two depth blocks (of the same shape and number of pixels), cb_d and nb_d, may be compared for example in one or more of the following ways. One way is to compute an average pixel-wise deviation (difference) for example as follows:

$$nsad(cb\_d, nb\_d) = sum(abs(cb\_d(x,y) - nb\_d(x,y)))/num\_pixels \quad (7)$$

where x and y are coordinates of the pixels in cb_d and nb_d, num_pixels is number of pixels within cb_d and functions sum and abs are defined above. This equation may also be regarded as a sum of absolute differences (SAD) between the given depth blocks normalized by the number of pixels in the block.

In another example of a similarity or distortion metric, a sum of squared differences (SSD) normalized by the number of pixels may be used as computed below:

$$nsse(cb\_d, nb\_d) = sum((cb\_d(x,y) - nb\_d(x,y))^2)/num\_pixels \quad (8)$$

where x and y are coordinates of the pixels in cb_d and in its neighboring depth/disparity block (nb_d), num_pixels is number of pixels within cb_d, notation ^2 indicates a power of two, and function sum is defined above.

In another example, a sum of transformed differences (SATD) may be used as a similarity or distortion metric. Both the current depth/disparity block cb_d and a neighboring depth/disparity block nb_d are transformed using for example DCT or a variant thereof, herein marked as function T( ). Let tcb_d be equal to T(cb_d) and tnb_d be equal to T(nb_d). Then, either the sum of absolute or squared differences is calculated and may be normalized by the number of pixels/samples, num_pixels, in cb_d or nb_d, which is also equal to the number of transform coefficients in tcb_d or tnb_d. In the following equation, a version of sum of transformed differences using sum of absolute differences is given:

$$nsatd(cb\_d, nb\_d) = sum(abs(tcb\_d(x,y) - tnb\_d(x,y)))/num\_pixels \quad (9)$$

Other distortion metrics, such as the structural similarity index (SSIM), may also be used for the derivation the similarity of two depth blocks.

The similarity or distortion metric might not performed for all sample location of cb_d and nb_d but only for selected sample locations, such as the four corner samples, and/or cb_d and nb_d may be downsampled before performing the similarity or distortion metric computation.

Function diff(cb_d, nb_d) may be defined as follows to enable access any similarity or distortion metric:

diff(cb_d,nb_d)=

$nsad(cb\_d,nb\_d)$, if sum of absolute differences is used $nsse(cb\_d,nb\_d)$, if sum of squared differences is used $nsatd(cb\_d,nb\_d)$, if sum of transformed absolute differences is used  (10)

Any similarity/distortion metric could be added to the definition of function diff(cb_d, nb_d). In some embodiments, the used similarity/distortion metric is pre-defined and therefore stays the same in both the encoder and the decoder. In some embodiments, the used similarity/distortion metric is determined by the encoder, for example using rate-distortion optimization, and encoded in the bitstream as one or more indications. The indication(s) of the used similarity/distortion metric may be included for example in a sequence parameter set, a picture parameter set, a slice parameter set, a picture header, a slice header, within a macroblock syntax structure, and/or anything alike. In some embodiments, the indicated similarity/distortion metric may be used in pre-determined operations in both the encoding and the decoding loop, such as depth/disparity based motion vector prediction. In some embodiments, the decoding processes for which the indicated similarity/distortion metric is indicated are also indicated in the bitstream for example in a sequence parameter set, a picture parameter set, a slice parameter set, a picture header, a slice header, within a macroblock syntax structure, or anything alike. In some embodiments, it is possible to have more than one pair of indications for the depth/disparity metric and the decoding processes the metric is applied to in a the bitstream having the same persistence for the decoding process, i.e. applicable to decoding of the same access units. The encoder may select which similarity/distortion metric is used for each particular decoding process where a similarity/distortion based selection or other processing is used, such as depth/disparity based motion vector prediction, and encode respective indications of the selected disparity/distortion metrics and to which decoding processes they apply to into the bitstream.

When the similarity of disparity blocks is compared, the viewpoints of the blocks may be normalized, e.g. so that the disparity values are scaled to result from the same camera separation in both compared blocks.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

In scalable multiview coding, the same bitstream may contain coded view components of multiple views and at least some coded view components may be coded using quality and/or spatial scalability.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). Currently, two designs to realize scalability are investigated for SHVC. One is reference index based, where an inter-layer reference picture can be included in a one or more reference picture lists of the current picture being coded or decoded (as described above). Another may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope an+d/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as long term reference pictures.

In SMV-HEVC and a reference index based SHVC solution, inter-layer motion parameter prediction may be performed by setting the inter-layer reference picture as the collocated reference picture for TMVP derivation. A motion field mapping process between two layers may be performed for example to avoid block level decoding process modification in TMVP derivation. A motion field mapping could also be performed for multiview coding, but a present draft of MV-HEVC does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

The TMVP process of HEVC is limited to one target picture per slice in the merge mode and one collocated picture (per slice). When applying the reference index based scalability on top of HEVC, the TMVP process of HEVC has limited applicability as explained in the following in the case of the merge mode. In the example, the target reference picture (with index 0 in the reference picture list) is a short-term reference picture. The motion vector in the collocated PU, if referring to a short-term (ST) reference picture, is scaled to form a merge candidate of the current PU (PU0), as shown in the FIG. 9a, wherein MV0 is scaled to MV0' during the merge mode process. However, if the collocated PU has a motion vector (MV1) referring to an inter-view reference picture, marked as long-term, the motion vector is not used to predict the current PU (PU1).

There might be a significant amount of collocated PUs (in the collocated picture) which contain motion vectors referring to an inter-view reference picture while the target reference index (being equal to 0) indicates a short-term reference picture. Therefore, disabling prediction from those motion vectors makes the merge mode less efficient. There have been proposals to overcome this issue, some of which are explained in the following paragraphs.

An additional target reference index may be indicated by the encoder in the bitstream and decoded by the decoder from the bitstream and/or inferred by the encoder and/or the decoder. As shown in the FIG. 9b, MV1 of the co-located block of PU1 can be used to form a disparity motion vector merging candidate. In general, when the reference index equal to 0 represents a short-term reference picture, the additional target reference index is used to represent a long-term reference picture. When the reference index equal to 0 represents a long-term reference picture, the additional target reference index is used to represent a short-term reference picture.

The methods to indicate or infer the additional reference index include but are not limited to the following:

Indication the additional target reference index in the bitstream, for example within the slice segment header syntax structure.

Deriving the changed target reference index to be equal to the smallest reference index which has a different marking (as used as short-term or long-term reference) from that of reference index 0.

In the case the co-located PU points to a reference picture having a different layer identifier (equal to layerA) than that for reference index 0, deriving the changed target reference index to be equal to the smallest reference index that has layer identifier equal to layerA.

In the merge mode process the default target picture (with reference index 0) is used when its marking as short-term or long-term reference picture is the same as that of the reference picture of the collocated block. Otherwise (i.e., when the marking of the reference picture corresponding to the additional reference index as short-term or long-term reference picture is the same as that of the reference picture of the collocated block), the target picture identified by the additional reference index is used.

In a textureRL based SHVC solution, the inter-layer texture prediction may be performed at CU level for which a new prediction mode, named as textureRL mode, is introduced. The collocated upsampled base layer block is used as the prediction for the enhancement layer CU coded in textureRL mode. For an input CU of the enhancement layer encoder, the CU mode may be determined among intra, inter and textureRL modes, for example. The use of the textureRL feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred. Furthermore, the textureRL may be selected by the encoder at CU level and may be indicated in the bitstream per each CU for example using a CU level flag (texture_rl_flag) which may be entropy-coded e.g. using context adaptive arithmetic coding (e.g. CABAC).

The residue of textureRL predicted CU may be coded as follows. The transform process of textureRL predicted CU may be the same as that for the intra predicted CU, where a discrete sine transform (DST) is applied to TU of luma component having 4×4 size and a discrete cosine transform (DCT) is applied to the other type of TUs. Transform coefficient coding of a textureRL-predicted CU may be the same to that of inter predicted CU, where no_residue_flag may be used to indicate whether the coefficients of the whole CU are skipped.

In a textureRL based SHVC solution, in addition to spatially and temporally neighboring PUs, the motion parameters of the collocated reference-layer block may also used to form the merge candidate list. The base layer merge candidate may be derived at a location collocated to the central position of the current PU and may be inserted in a particular location of the merge list, such as the first candidate in merge list. In the case of spatial scalability, the reference-layer motion vector may be scaled according to the spatial resolution ratio between the two layers. The pruning (duplicated candidates check) may be performed for each spatially neighboring candidate with collocated base layer candidate. For the collocated base layer merge candidate and spatial merge candidate derivation, a certain maximum number of merge candidates may be used; for example four merge candidates may be selected among candidates that are located in six different positions. The temporal merge candidate may be derived in the same manner as done for HEVC merge list. When the number of candidates does not reach to maximum number of merge candidates (which may be determined by the encoder and may be indicated in the bitstream and may be assigned to the variable MaxNumMergeCand), the additional candidates, including combined bi-predictive candidates and zero merge candidates, may be generated and added at the end of the merge list, similarly or identically to HEVC merge list construction.

In some coding and/or decoding arrangements, a reference index based scalability and a block-level scalability approach, such a textureRL based approach, may be combined. For example, multiview-video-plus-depth coding and/or decoding may be performed as follows. A textureRL approach may be used between the components of the same view. For example, a depth view component may be inter-layer predicted using a textureRL approach from a texture view component of the same view. A reference index based approach may be used for inter-view prediction, and in some embodiments inter-view prediction may be applied only between view components of the same component type.

Work is also ongoing to specify depth-enhanced video coding extensions to the HEVC standard, which may be referred to as 3D-HEVC, in which texture views and depth views may be coded into a single bitstream where some of the texture views may be compatible with HEVC. In other words, an HEVC decoder may be able to decode some of the texture views of such a bitstream and can omit the remaining texture views and depth views.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where enhancement layer pictures provide higher fidelity and/or higher spatial resolution in chroma (e.g. coded in 4:4:4 chroma format) than base layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut. Any number of such other types of scalability may be realized for example with a reference index based approach or a block-based approach e.g. as described above.

An access unit and a coded picture may be defined for example in one of the following ways in various HEVC extensions:
  A coded picture may be defined as a coded representation of a picture comprising VCL NAL units with a particular value of nuh_layer_id and containing all coding tree units of the picture. An access unit may be defined as set of NAL units that are associated with each other according to a specified classification rule, are consecutive in decoding order, and contain exactly one coded picture.
  A coded picture may be defined a coded representation of a picture comprising VCL NAL units with a particular value of nuh_layer_id and containing all coding tree units of the picture. An access unit may be defined to comprise a coded picture with nuh_layer_id equal to 0 and zero or more coded picture pictures with non-zero nuh_layer_id.
  A coded picture may be defined as a coded picture to comprise VCL NAL units of nuh_layer_id equal to 0 (only), a layer picture may be defined to comprise VCL NAL units of a particular non-zero nuh_layer_id. An access unit may be defined to comprise a coded picture and zero or more layer pictures.

The constraints on NAL unit order may need to be specified using different phrasing depending on which option to define an access unit and a coded picture is used. Furthermore, the hypothetical reference decoder (HRD) may need to be specified using different phrasing depending on which option to define an access unit and a coded picture is used. It is anyhow possible to specify identical NAL unit order constraints and HRD operation for all options. Moreover, a majority of decoding processes is specified for coded pictures and parts thereof (e.g. coded slices) and hence the decision on which option to define an access unit and a coded picture have only a small or a non-existing impact on the way the decoding processes are specified. In some embodiments, the first option above may be used but it should be understood that some embodiments may be similarly described using the other definitions.

Assuming the first option to define an access unit and a coded picture, a coded video sequence may be defined as a sequence of access units that consists, in decoding order, of a CRA access unit with nuh_layer_id equal to 0 that is the first access unit in the bitstream, an IDR access unit with nuh_layer_id equal to 0 or a BLA access unit with nuh_layer_id equal to 0, followed by zero or more access units none of which is an IDR access unit with nuh_layer_id equal to 0 nor a BLA access unit with nuh_layer_id equal to 0 up to but not including any subsequent IDR or BLA access unit with nuh_layer_id equal to 0.

Term temporal instant or time instant or time entity may be defined to represent a same capturing time or output time or output order. For example, if a first view component of a first view is captured at the same time as a second view component in a second view, these two view components may be considered to be of the same time instant. An access unit may be defined to contain pictures (or view components) of the same time instant, and hence in this case pictures residing in an access unit may be considered to be of the same time instant. Pictures of the same time instant may be indicated (e.g. by the encoder) using multiple means and may be identified (e.g. by the decoding) using multiple means, such as a picture order count (POC) value or a timestamp (e.g. an output timestamp).

Many video encoders utilize the Lagrangian cost function to find rate-distortion optimal coding modes, for example the desired macroblock mode and associated motion vectors. This type of cost function uses a weighting factor or λ to tie together the exact or estimated image distortion due to lossy coding methods and the exact or estimated amount of information required to represent the pixel/sample values in an image area. The Lagrangian cost function may be represented by the equation:

$$C = D + \lambda R \qquad (11)$$

where C is the Lagrangian cost to be minimised, D is the image distortion (for example, the mean-squared error between the pixel/sample values in original image block and in coded image block) with the mode and motion vectors currently considered, λ is a Lagrangian coefficient and R is the number of bits needed to represent the required data to reconstruct the image block in the decoder (including the amount of data to represent the candidate motion vectors).

In the following, the term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

There are ongoing standardization activities to specify a multiview extension of HEVC (which may be referred to as MV-HEVC), a depth-enhanced multiview extension of HEVC (which may be referred to as 3D-HEVC), and a scalable extension of HEVC (which may be referred to as SHVC). A multi-loop decoding operation has been envisioned to be used in all these specifications.

In scalable video coding schemes utilizing multi-loop (de)coding, decoded reference pictures for each (de)coded layer may be maintained in a decoded picture buffer (DPB). The memory consumption for DPB may therefore be significantly higher than that for scalable video coding schemes with single-loop (de)coding operation. However, multi-loop (de)coding may have other advantages, such as relatively few additional parts compared to single-layer coding.

In scalable video coding with multi-loop decoding, enhanced layers may be predicted from pictures that had been already decoded in the base (reference) layer. Such pictures may be stored in the DPB of base layer and may be marked as used for reference. In certain circumstances, a picture marked as used for reference may be stored in fast memory, in order to provide fast random access to its samples, and may remain stored after the picture is supposed to be displayed in order to be used as reference for prediction. This imposes requirements on memory organization. In order to relax such memory requirements, a conventional design in multi-loop multilayer video coding schemes (such as MVC) assumes restricted utilization of inter-layer predictions. Inter-layer/inter-view prediction for enhanced view is allowed from a decoded picture of the base view located at the same access unit, in other words, representing the scene at the same time entity. In such designs, the number of reference pictures available for predicting enhanced views is increased by 1 for each reference view.

It has been proposed that in scalable video coding with multi-loop (de)coding operation pictures marked as used for reference need not originate from the same access units in all layers. For example, a smaller number of reference pictures may be maintained in an enhancement layer compared to the base layer. In some embodiments a temporal inter-layer prediction, which may also be referred to as a diagonal inter-layer prediction or diagonal prediction, can be used to improve compression efficiency in such coding scenarios.

Another, complementary way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

If the prediction, such as predicted variable values and/or prediction blocks, is not refined by the encoder using any form of prediction error or residual coding, prediction may be referred to as inheritance. For example, in the merge mode of HEVC, the prediction motion information is not refined e.g. by (de)coding motion vector differences, and hence the merge mode may be considered as an example of motion information inheritance.

A coded video sequence (CVS) in scalable extensions of HEVC may be specified as follows: A coded video sequence is a sequence of access units that consists, in decoding order, of an IRAP access unit containing an IRAP picture having nuh_layer_id equal to 0 and NoRaslOutputFlag equal to 1, followed by zero or more access units that are not IRAP access units containing an IRAP picture having nuh_layer_id equal to 0 and NoRaslOutputFlag equal to 1, including all subsequent access units up to but not including any subsequent access unit that is an IRAP access unit containing an IRAP picture having nuh_layer_id equal to 0 and NoRaslOutputFlag equal to 1.

Scalable bitstreams with IRAP pictures or similar that are not aligned across layers may be used, for example more frequent RAP pictures can be used in the base layer, where they have a smaller size due to a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding the TRAP picture from which the decoding of a layer can be started. These pictures that may be omitted may be specifically labeled by the encoder or another entity within the bitstream. For example, one or more specific NAL unit types may be used for them. These pictures may be referred to as cross-layer random access skip (CL-RAS) pictures.

A layer-wise start-up mechanism may start the output of enhancement layer pictures from an TRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output while other pictures preceding such an IRAP picture might not be output.

A layer-wise start-up mechanism may be initiated in one or more of the following cases:

At the beginning of a bitstream.
At the beginning of each coded video sequence.
At the beginning of a coded video sequence, when specifically controlled, e.g. when a decoding process is started or re-started e.g. as response to tuning into a broadcast or seeking to a position in a file or stream.
At an IRAP picture (or similar) in a base layer.

If a layer-wise start-up mechanism is invoked for each coded video sequence, even if the first access unit contained non-IRAP pictures they cannot use inter prediction from reference pictures in the previous coded video sequence. Hence, it might not be desirable to invoke a layer-wise start-up mechanism unconditionally for each coded video sequence.

Concatenation of coded video data, which may also be referred to as splicing, may occur, for example coded video sequences are concatenated into a bitstream that is broadcast or streamed or stored in a mass memory. For example, coded video sequences representing commercials or advertisements may be concatenated with movies or other "primary" content.

As said above, scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s). Embodiments for such splicer operation, required signal means or indications within a bitstream as well as decoder operation for decoding indications and triggering a layer-wise start-up operation are presented below.

In some embodiments, a BLA picture in the base layer may trigger a layer-wise start-up process. Hence, a splicer may convert the base layer picture in the first access unit of said second coded video sequence into a BLA picture. However, in HEVC and potentially in other coding schemes, the syntax of an IDR picture and a BLA picture may differ, particularly the syntax of the slice header may differ in IDR and BLA pictures. Hence, a splicer would need to rewrite the slice header if the base layer picture in the first access unit of said second coded video sequence is an IDR picture.

It is noted that it may be undesirable to trigger a layer-wise start-up process in decoders always when there is an IDR picture in the base layer. That is because non-aligned IRAP pictures may be used in conventionally coded bitstreams (when no splicing has taken place).

In some embodiments specific indication(s) are therefore provided in the bitstream syntax to indicate triggering of a layer-wise start-up process. These indication(s) may be generated by encoders or splicers and may be obeyed by decoders. In some embodiments, these indication(s) may be used for particular picture type(s) or NAL unit type(s) only, such as only for IDR pictures, while in other embodiments these indication(s) may be used for any picture type(s).

Said indication(s) may for example reside in one or more of the following syntax structures:

NAL unit header
Slice header
Slice segment header
Picture parameter set
Group of slices parameter set or similar
Picture header
Access unit delimiter
Picture delimiter
Prefix NAL unit
Suffix NAL unit In some embodiments, said indication(s) are separate from an indication of the picture type, such as the nal_unit_type indicated within the NAL unit header structure. Hence, said indication(s) may be considered to indicate one or more cross-layer impacts while the picture type may be considered to indicate intra-layer impacts. Said indication(s) may apply with certain picture type(s), which may be indicated by the NAL unit header. For example, said indication(s) may apply with IRAP picture types or a subset thereof. In some embodiments, said indication(s) apply with IDR picture type(s) only.

In some embodiments, a new picture type or types, which may be referred to as cross-layer instantaneous decoding refresh (CL-IDR) pictures and which may be indicated by the NAL unit header, may be used. The CL-IDR pictures may be categorized as IRAP pictures (or alike). There may be for example two CL-IDR picture types, CL_IDR_W_RADL and CL_IDR_N_LP, where CL_IDR_W_RADL may be associated with RADL pictures and CL_IDR_N_LP has no leading pictures.

If said indication(s) reside in a slice header and/or in a slice segment header, they may use for example previously reserved bits. For example, a slice segment header syntax for a single-layer coding scheme may include reserved syntax elements, which may be used for example to introduce syntax elements that do not change the decoding of the base layer but may change the operation of a multi-layer decoding process. An example embodiment using HEVC syntax is provided in the following.

In HEVC, the syntax of the slice segment header is the following:

|  | Descriptor |
|---|---|
| slice_segment_header( ) { | |
|     first_slice_segment_in_pic_flag | u(1) |
|     if( nal_unit_type >= BLA_W_LP && nal_unit_type <= RSV_IRAP_VCL23 ) | |
|         no_output_of_prior_pics_flag | u(1) |
|     slice_pic_parameter_set_id | ue(v) |
|     if( !first_slice_segment_in_pic_flag ) { | |
|         if( dependent_slice_segments_enabled_flag ) | |
|             dependent_slice_segment_flag | u(1) |
|         slice_segment_address | u(v) |
|     } | |

|  | Descriptor |
|---|---|
| if( !dependent_slice_segment_flag ) { | |
|     for( i = 0; i < num_extra_slice_header_bits; i++ ) | |
|         slice_reserved_flag[ i ] | u(1) |
|     slice_type | ue(v) |
|     if( output_flag_present_flag ) | |
|         pic_output_flag | u(1) |
|     if( separate_colour_plane_flag = = 1 ) | |
|         colour_plane_id | u(2) |
|     if( nal_unit_type != IDR_W_RADL && nal_unit_type != IDR_N_LP ) { | |
|         slice_pic_order_cnt_lsb | u(v) |
|         short_term_ref_pic_set_sps_flag | u(1) |
|         if( !short_term_ref_pic_set_sps_flag ) | |
|             short_term_ref_pic_set( num_short_term_ref_pic_sets ) | |
|         else if( num_short_term_ref_pic_sets > 1 ) | |
|             short_term_ref_pic_set_idx | u(v) |
|         if( long_term_ref_pics_present_flag ) { | |
|             if( num_long_term_ref_pics_sps > 0 ) | |
|                 num_long_term_sps | ue(v) |
|             num_long_term_pics | ue(v) |
|             for( i = 0; i < num_long_term_sps + num_long_term_pics; i++ ) { | |
|                 if( i < num_long_term_sps ) { | |
|                     if( num_long_term_ref_pics_sps > 1 ) | |
|                       lt_idx_sps[ i ] | u(v) |
|                 } else { | |
|                   poc_lsb_lt[ i ] | u(v) |
|                   used_by_curr_pic_lt_flag[ i ] | u(1) |
|                 } | |
|                 delta_poc_msb_present_flag[ i ] | u(1) |
|                 if( delta_poc_msb_present_flag[ i ] ) | |
|                   delta_poc_msb_cycle_lt[ i ] | ue(v) |
|             } | |
|         } | |
|         if( sps_temporal_mvp_enabled_flag ) | |
|             slice_temporal_mvp_enabled_flag | u(1) |
|     } | |
|     if( sample_adaptive_offset_enabled_flag ) { | |
|         slice_sao_luma_flag | u(1) |
|         slice_sao_chroma_flag | u(1) |
|     } | |
|     if( slice_type = = P | | slice_type = = B ) { | |
|         num_ref_idx_active_override_flag | u(1) |
|         if( num_ref_idx_active_override_flag ) { | |
|             num_ref_idx_l0_active_minus1 | ue(v) |
|             if( slice_type = = B ) | |
|                 num_ref_idx_l1_active_minus1 | ue(v) |
|         } | |
|         if( lists_modification_present_flag && NumPocTotalCurr > 1 ) | |
|             ref_pic_lists_modification( ) | |
|         if( slice_type = = B ) | |
|             mvd_l1_zero_flag | u(1) |
|         if( cabac_init_present_flag ) | |
|             cabac_init_flag | u(1) |
|         if( slice_temporal_mvp_enabled_flag ) { | |
|             if( slice_type = = B ) | |
|                 collocated_from_l0_flag | u(1) |
|             if( ( collocated_from_l0_flag && num_ref_idx_l0_active_minus1 > 0 ) | | | |
|                 ( !collocated_from_l0_flag && num_ref_idx_l1_active_minus1 > 0 ) ) | |
|                 collocated_ref_idx | ue(v) |
|         } | |
|         if( ( weighted_pred_flag && slice_type = = P ) | | | |
|             ( weighted_bipred_flag && slice_type = = B ) ) | |
|             pred_weight_table( ) | |
|         five_minus_max_num_merge_cand | ue(v) |
|     } | |
|     slice_qp_delta | se(v) |
|     if( pps_slice_chroma_qp_offsets_present_flag ) { | |
|         slice_cb_qp_offset | se(v) |
|         slice_cr_qp_offset | se(v) |
|     } | |
|     if( deblocking_filter_override_enabled_flag ) | |
|         deblocking_filter_override_flag | u(1) |
|     if( deblocking_filter_override_flag ) { | |
|         slice_deblocking_filter_disabled_flag | u(1) |

| | Descriptor |
|---|---|
| `        if( !slice_deblocking_filter_disabled_flag ) {` | |
| `            ``slice_beta_offset_div2` | se(v) |
| `            ``slice_tc_offset_div2` | se(v) |
| `        }` | |
| `    }` | |
| `    if( pps_loop_filter_across_slices_enabled_flag &&` | |
| `        ( slice_sao_luma_flag || slice_sao_chroma_flag ||` | |
| `          !slice_deblocking_filter_disabled_flag ) )` | |
| `        ``slice_loop_filter_across_slices_enabled_flag` | u(1) |
| `}` | |
| `if( tiles_enabled_flag || entropy_coding_sync_enabled_flag ) {` | |
| `    ``num_entry_point_offsets` | ue(v) |
| `    if( num_entry_point_offsets > 0 ) {` | |
| `        ``offset_len_minus1` | ue(v) |
| `        for( i = 0; i < num_entry_point_offsets; i++ )` | |
| `            ``entry_point_offset_minus1``[ i ]` | u(v) |
| `    }` | |
| `}` | |
| `if( slice_segment_header_extension_present_flag ) {` | |
| `    ``slice_segment_header_extension_length` | ue(v) |
| `    for( i = 0; i < slice_segment_header_extension_length; i++)` | |
| `        ``slice_segment_header_extension_data_byte``[ i ]` | u(8) |
| `}` | |
| `byte_alignment( )` | |
| `}` | |

The syntax element num_extra_slice_header_bits is specified in the PPS. The slice_reserved_flag[i] is specified as follows in HEVC: slice_reserved_flag[i] has semantics and values that are reserved for future use by ITU-T|ISO/IEC. It can therefore be used in MV-HEVC/SHVC or other extensions to specify decoding operations that are associated with base layer pictures.

In some embodiments, one of the slice_reserved_flag[i] flags is used as a triggering mechanism for layer-wise start-up process. For example, the following syntax may be used:

| | Descriptor |
|---|---|
| `slice_segment_header( ) {` | |
| `    ``first_slice_segment_in_pic_flag` | u(1) |
| `    if( nal_unit_type >= BLA_W_LP && nal_unit_type <= RSV_IRAP_VCL23 )` | |
| `        ``no_output_of_prior_pics_flag` | u(1) |
| `    ``slice_pic_parameter_set_id` | ue(v) |
| `    if( !first_slice_segment_in_pic_flag ) {` | |
| `        if( dependent_slice_segments_enabled_flag )` | |
| `            ``dependent_slice_segment_flag` | u(1) |
| `        ``slice_segment_address` | u(v) |
| `    }` | |
| `    if( !dependent_slice_segment_flag ) {` | |
| `        if( num_extra_slice_header_bits > 0 ) {` | |
| `            extraBitsRead = 1` | |
| `            ``discardable_flag` | u(1) |
| `            if( num_extra_slice_header_bits > 1 ) {` | |
| `                extraBitsRead = 2` | |
| `                ``cross_layer_bla_flag` | u(1) |
| `            }` | |
| `            for( i = extraBitsRead; i < num_extra_slice_header_bits ; i++ )` | |
| `                ``slice_reserved_flag``[ i ]` | u(1) |
| `        }` | |
| `        ``slice_type` | ue(v) |
| `        ...` | |

In some embodiments, the cross_layer_bla_flag may be present only in slice segment headers of certain NAL unit types only. In some embodiments, the cross_layer_bla_flag may be present only in slice segment headers of certain layer(s) only, such as the base layer only or each layer not depending on any other layer.

In some embodiments, when cross_layer_bla_flag is equal to 1, a layer-wise start-up process is used in decoding. When cross_layer_bla_flag is equal to 0, a layer-wise start-up process is not used in decoding.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation. NoClrasOutputFlag may be set for example using one or more of the following steps:

1) If the current picture is an TRAP picture that is the first picture in the bitstream, NoClrasOutputFlag is set equal to 1.

2) Otherwise, if some external means are available to set the variable NoClrasOutputFlag equal to a value for a base-layer IRAP picture, the variable NoClrasOutputFlag is set equal to the value provided by the external means.

3) Otherwise, if the current picture is a BLA picture that is the first picture in a coded video sequence (CVS), NoClrasOutputFlag is set equal to 1.
4) Otherwise, if the current picture is an IDR picture that is the first picture in a coded video sequence (CVS) and cross_layer_bla_flag is equal to 1, NoClrasOutputFlag is set equal to 1.
5) Otherwise, NoClrasOutputFlag is set equal to 0.

Step 4 above may alternatively be phrased more generally for example as follows: Otherwise, if the current picture is an IRAP picture that is the first picture in a CVS and an indication of layer-wise start-up process is associated with the IRAP picture, NoClrasOutputFlag is set equal to 1. It should be understood that other ways to phrase the condition are possible and equally applicable.

A decoding process for layer-wise start-up may be for example controlled by two array variables LayerInitialisedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there are 64 layers enabled (e.g. with a 6-bit nuh_layer_id), the variables may be reset as follows: the variable LayerInitialisedFlag[i] is set equal to 0 for all values of i from 0 to 63, inclusive, and the variable FirstPicInLayerDecodedFlag[i] is set equal to 0 for all values of i from 1 to 63, inclusive.

The decoding process may include the following or similar to control the output of RASL pictures. When the current picture is an IRAP picture, the following applies:

If LayerInitialisedFlag[nuh_layer_id] is equal to 0, the variable NoRaslOutputFlag is set equal to 1.

Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.

Otherwise, the variable HandleCraAsBlaFlag is set equal to 0 and the variable NoRaslOutputFlag is set equal to 0.

In some embodiments, the decoding process may include the following to update the LayerInitialisedFlag for a layer. When the current picture is an IRAP picture and either one of the following is true, LayerInitialisedFlag[nuh_layer_id] is set equal to 1.

nuh_layer_id is equal to 0.
LayerInitialisedFlag[nuh_layer_id] is equal to 0 and LayerInitialisedFlag[refLayerId] is equal to 1 for all values of refLayerId equal to RefLayerId[nuh_layer_id][j], where j is in the range of 0 to NumDirectRefLayers[nuh_layer_id]−1, inclusive.

In some embodiments, the encoder process may be constrained so that it is required that when the current picture is an IRAP picture, either one of the following is true:

nuh_layer_id is equal to 0.
LayerInitialisedFlag[refLayerId] is equal to 1 for all values of refLayerId equal to RefLayerId[nuh_layer_id][j], where j is in the range of 0 to NumDirectRefLayers[nuh_layer_id]−1, inclusive.

In some embodiments, the above-mentioned constrain in the encoding process may be pre-defined for example in a coding standard. In some embodiments, the above-mentioned constraint may be indicated by the encoder in the bitstream. If the above-mentioned constraint is pre-defined or decoded by from the bitstream to be followed in a bitstream or a part thereof, the decoding process may set LayerInitialisedFlag[nuh_layer_id] equal to 1 when the current picture is an IRAP picture.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitialisedFlag[layerId] is equal to 0. In HRD operations, CL-RAS pictures may need to be taken into consideration in derivation of CPB arrival and removal times. In some embodiments, decoders may ignore any CL-RAS pictures, as these pictures are not specified for output and have no effect on the decoding process of any other pictures that are specified for output.

In some embodiments, the same syntax element to indicate cross_layer_bla_flag or similar may be used to indicate CL-RAS pictures or potential CL-RAS pictures. CL-RAS pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

An example embodiment of using the same syntax element to indicate cross_layer_bla_flag (or similar) and CL-RAS pictures is presented below with relation to the HEVC slice segment header syntax.

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |

-continued

|  | Descriptor |
|---|---|
| if( !dependent_slice_segment_flag ) { | |
|     if( num_extra_slice_header_bits > 0 ) { | |
|         extraBitsRead = 1 | |
|         discardable_flag | u(1) |
|         if( num_extra_slice_header_bits > 1 ) { | |
|             extraBitsRead = 2 | |
|             cross_layer_constraint_flag | u(1) |
|         } | |
|         for( i = extraBitsRead; i < num_extra_slice_header_bits ; i++ ) | |
|             slice_reserved_flag[ i ] | u(1) |
|     } | |
|     slice_type | ue(v) |
| ... | |

A picture may be considered as a CL-RAS picture when it is a non-IRAP picture (e.g. as determined by its NAL unit type), it resides in an enhancement layer and it has cross_layer_constraint_flag (or similar) equal to 1. Otherwise, a picture may be classified of being a non-CL-RAS picture. cross_layer_bla_flag may be inferred to be equal to 1 (or a respective variable may be set to 1), if the picture is an IRAP picture (or in some embodiments, an IDR picture) (e.g. as determined by its NAL unit type), it resides in the base layer, and cross_layer_constraint_flag is equal to 1. Otherwise, cross_layer_bla_flag may inferred to be equal to 0 (or a respective variable may be set to 0). Various embodiments may be applied with CL-RAS pictures identified like this and/or cross_layer_bla_flag (or similar) identified like this.

In some embodiments, a splicer inserts said indication(s) in the bitstream when concatenating a second coded video sequence after a first coded video sequence. A splicer may insert an indication of cross_layer_bla_flag (or similar) or change the value of cross_layer_bla_flag (or similar) and hence indicate triggering of a layer-wise start-up mechanism in decoders receiving the bitstream or at least a part containing the second coded video sequence. A splicer may additionally insert indication(s) of CL-RAS pictures.

Figure 4:
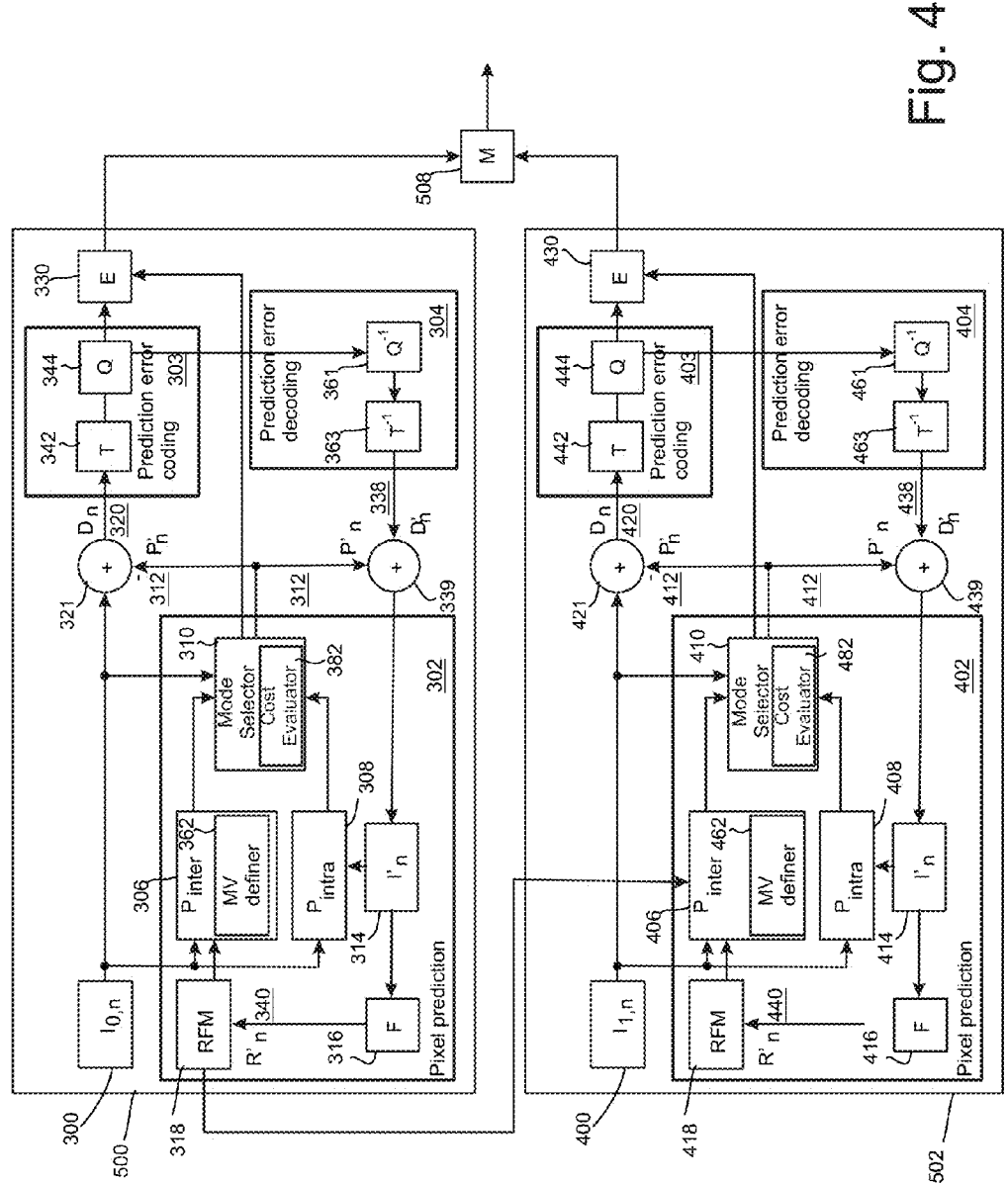
FIG. 4 shows schematically an embodiment of an encoder.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

The mode selector 310 may use, in the cost evaluator block 382, for example Lagrangian cost functions to choose between coding modes and their parameter values, such as motion vectors, reference indexes, and intra prediction direction, typically on block basis. This kind of cost function may use a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer pictures 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer pictures 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

For completeness a suitable decoder is hereafter described. However, some decoders may not be able to process enhancement layer data wherein they may not be able to decode all received images.

Figure 5:
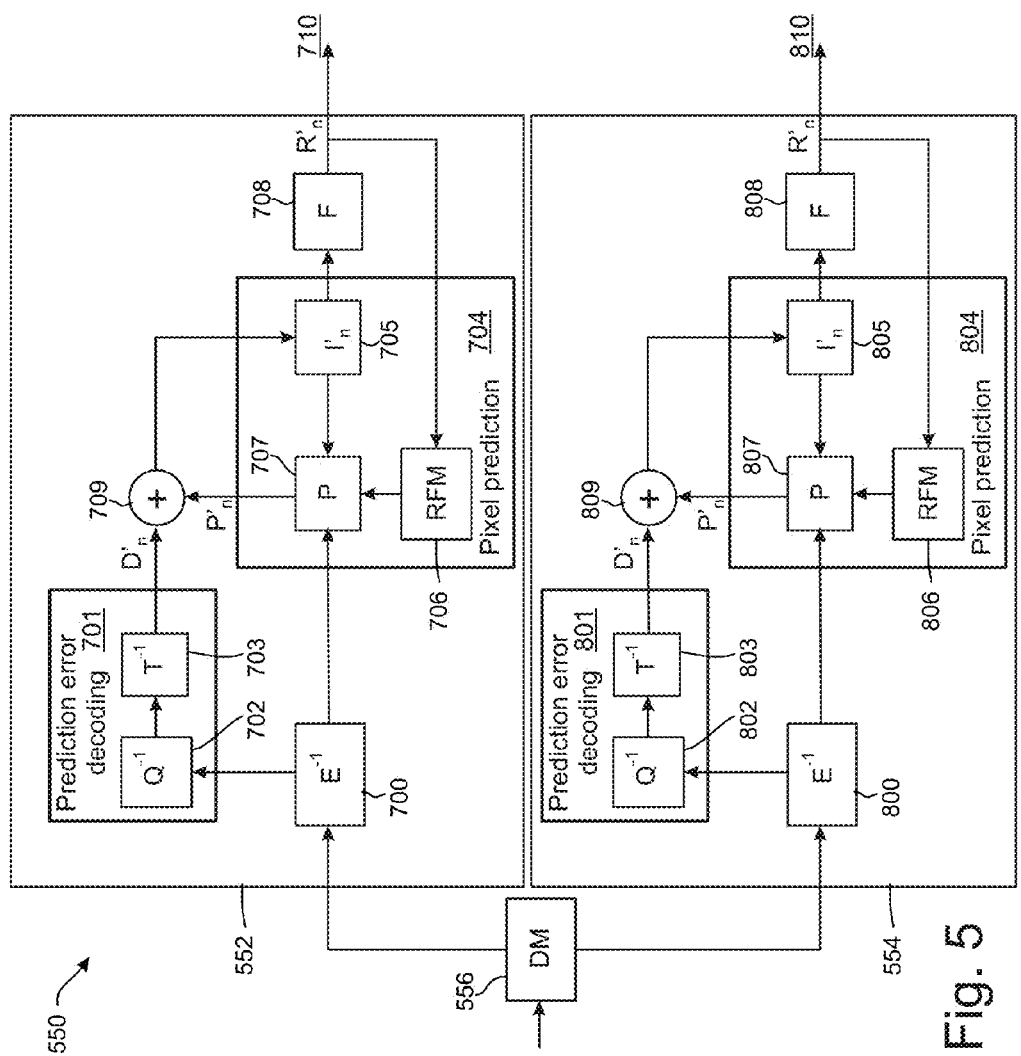
FIG. 5 shows schematically an embodiment of a decoder.

At the decoder side similar operations may be performed to reconstruct the image blocks. FIG. 5 shows a block diagram of a video decoder 550 suitable for employing embodiments of the invention. In this embodiment the video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. The decoder shows an entropy decoder 700, 800 which performs an entropy decoding ($E^{-1}$) on the received signal. The entropy decoder thus performs the inverse operation to the entropy encoder 330, 430 of the encoder described above. The entropy decoder 700, 800 outputs the results of the entropy decoding to a prediction error decoder 701, 801 and pixel predictor 704, 804. Reference $P'_n$ stands for a predicted representation of an image block. Reference $D'_n$ stands for a reconstructed prediction error signal. Blocks 705, 805 illustrate preliminary reconstructed images or image blocks ($I'_n$). Reference $R'_n$ stands for a final reconstructed image or image block. Blocks 703, 803 illustrate inverse transform ($T^{-1}$). Blocks 702, 802 illustrate inverse quantization ($Q^{-1}$). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base view/non-base view components to obtain the preliminary reconstructed images ($I'_n$). Preliminary reconstructed and filtered base view images may be output 710 from the first decoder section 552 and preliminary reconstructed and filtered base view images may be output 810 from the second decoder section 554.

The pixel predictor 704, 804 receives the output of the entropy decoder 700, 800. The output of the entropy decoder 700, 800 may include an indication on the prediction mode used in encoding the current block. A predictor selector 707, 807 within the pixel predictor 704, 804 may determine that the current block to be decoded is an enhancement layer block. Hence, the predictor selector 707, 807 may select to use information from a corresponding block on another layer such as the base layer to filter the base layer prediction block while decoding the current enhancement layer block. An indication that the base layer prediction block has been filtered before using in the enhancement layer prediction by the encoder may have been received by the decoder wherein the pixel predictor 704, 804 may use the indication to provide the reconstructed base layer block values to the filter 708, 808 and to determine which kind of filter has been used, e.g. the SAO filter and/or the adaptive loop filter, or there may be other ways to determine whether or not the modified decoding mode should be used.

The predictor selector may output a predicted representation of an image block $P'_n$ to a first combiner 709. The predicted representation of the image block is used in conjunction with the reconstructed prediction error signal $D'_n$ to generate a preliminary reconstructed image $I'_n$. The preliminary reconstructed image may be used in the predictor 704, 804 or may be passed to a filter 708, 808. The filter applies a filtering which outputs a final reconstructed signal $R'_n$. The final reconstructed signal $R'_n$ may be stored in a reference frame memory 706, 806, the reference frame memory 706, 806 further being connected to the predictor 707, 807 for prediction operations.

The prediction error decoder 702, 802 receives the output of the entropy decoder 700, 800. A dequantizer 702, 802 of the prediction error decoder 702, 802 may dequantize the output of the entropy decoder 700, 800 and the inverse transform block 703, 803 may perform an inverse transform operation to the dequantized signal output by the dequantizer 702, 802. The output of the entropy decoder 700, 800 may also indicate that prediction error signal is not to be applied and in this case the prediction error decoder produces an all zero output signal.

It should be understood that for various blocks in FIG. 5 inter-layer prediction may be applied, even if it is not illustrated in FIG. 5. Inter-layer prediction may include sample prediction and/or syntax/parameter prediction. For example, a reference picture from one decoder section (e.g. RFM 706) may be used for sample prediction of the other decoder section (e.g. block 807). In another example, syntax elements or parameters from one decoder section (e.g. filter parameters from block 708) may be used for syntax/parameter prediction of the other decoder section (e.g. block 808).

In some embodiments the views may be coded with another standard other than H.264/AVC or HEVC.

Figure 1:
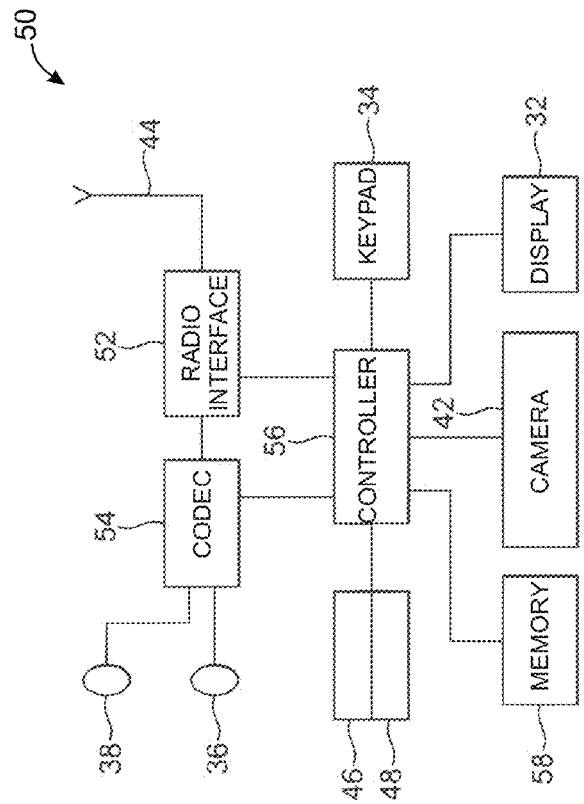
FIG. 1 shows schematically an electronic device employing some embodiments of the invention.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
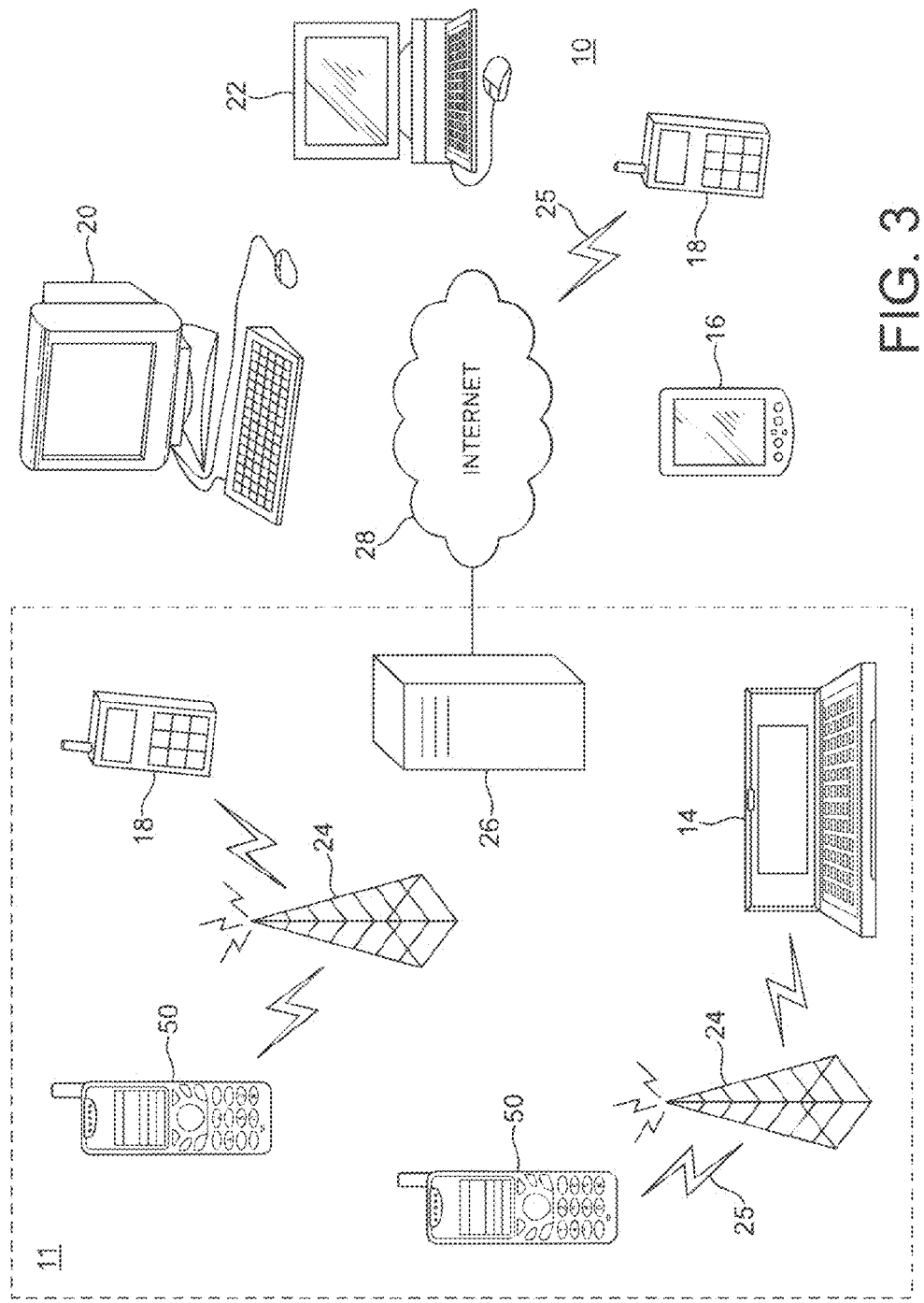
FIG. 3 further shows schematically electronic devices employing embodiments of the invention connected using wireless and/or wired network connections.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder. Likewise, where example embodiments have been described with reference to a splicer, it needs to be understood that a splicer could likewise be an encoder, a middle-box, or any other entity that creates or modifies a coded video bitstream.

In the above, some embodiments have been described with reference to an enhancement layer and a reference layer, where the reference layer may be for example a base layer.

In the above, some embodiments have been described with reference to an enhancement view and a reference view, where the reference view may be for example a base view.

In the above, some embodiments have been described with reference to motion information prediction. It needs to be understood that embodiments could be realized by applying motion information inheritance rather than motion information prediction.

In the above, methods have been described with reference to a block or blocks, where the blocks may be selected in various ways. For example, the block may be a unit for motion prediction, i.e. a block that has its own motion information associated with it, such as a prediction unit (PU) in HEVC. In another example, the block may be a unit for storing motion information for a decoded reference picture. Methods may be realized with different selection of the unit for a block.

It needs to be understood that embodiments may be applicable to any types of layered coding, for example for multiview coding, quality scalability, spatial scalability, and for multiview video plus depth coding.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1 and 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:
  receiving or obtaining a bitstream including coded pictures in two or more scalability layers;
  identifying a first coded picture within the bitstream, the first coded picture having a picture type that may be used to start decoding;
  determining that a layer-wise start-up is initiated with the first coded picture; and
  indicating in the bitstream an association of the first coded picture with a layer-wise start-up.

According to an embodiment, the method further comprises:
  indicating in the bitstream said association separately from indicating a type of the first coded picture.

According to a second example, there is provided a method comprising:
  receiving or obtaining a bitstream including coded pictures in two or more scalability layers;
  identifying a first coded picture within the bitstream, the first coded picture having a picture type that may be used to start decoding;
  determining that a layer-wise start-up is initiated with the first coded picture on the basis of an indication received in or along the bitstream of an association of the first coded picture with a layer-wise start-up.

According to an embodiment, the method further comprises:
  wherein the indication of said association is separate from an indication of a type of the first coded picture.

According to a third example, there is provided an apparatus comprising means for:
  receiving or obtaining a bitstream including coded pictures in two or more scalability layers;
  identifying a first coded picture within the bitstream, the first coded picture having a picture type that may be used to start decoding;
  determining that a layer-wise start-up is initiated with the first coded picture; and
  indicating in the bitstream an association of the first coded picture with a layer-wise start-up.

According to an embodiment, the apparatus further comprises means for:
  indicating in the bitstream said association separately from indicating a type of the first coded picture.

I claim:

1. An apparatus comprising at least one processor and at least one memory, said at least one memory stored with code thereon, which when executed by said at least one processor, causes an apparatus to perform at least the following:
  receive a bitstream including coded pictures in two or more scalability layers or encoding pictures into a bitstream in two or more scalability layers;
  identify a first coded picture within the bitstream, the first coded picture having a picture type that may be used to start decoding;
  determine that a layer-wise start-up is initiated with the first coded picture;
  indicate in or along the bitstream an association of the first coded picture with the layer-wise start-up, wherein the layer-wise start-up comprises:
    controlling the layer-wise startup by a first array variable, wherein each scalability layer of index i is associated with an entry in the first array variable indicative of whether correct decoding of the scalability layer corresponding to the entry in the first array variable has been initialized; and
    controlling the layer-wise startup by a second array variable, wherein each scalability layer of index i is associated with an entry in the second array variable indicative of whether a picture in the scalability layer corresponding to the entry in the second array variable has been decoded but may have been decoded incorrectly,
  and wherein the apparatus is further caused to:
  when the layer-wise start-up is initiated, set the first array variable equal to 0 and the second array variable equal to 0 for all scalability layers other than the scalability layer with index i equal to 0; and
  when the second array variable of the scalability layer with index i is equal to 0, generate unavailable pictures for reference pictures of a first picture in decoding order in an enhancement layer with index i; and cause one or more decoded pictures to be output.

2. The apparatus according to claim 1, said at least one memory stored with code thereon, which when executed by said at least one processor, causes the apparatus to perform at least the following:

indicate in the bitstream a type of the first coded picture separately from indicating said association.

3. An apparatus comprising at least one processor and at least one memory, said at least one memory stored with code thereon, which when executed by said at least one processor, causes an apparatus to perform at least the following:

receive or obtain a bitstream including coded pictures in two or more scalability layers;

identify a first coded picture within the bitstream, the first coded picture having a picture type that may be used to start decoding;

conclude that a layer-wise start-up is initiated with the first coded picture on a basis of an indication received in or along the bitstream of an association of the first coded picture with the layer-wise start-up, wherein the layer-wise start-up comprises:

controlling the layer-wise startup by a first array variable, wherein each scalability layer of index i is associated with an entry in the first array variable indicative of whether correct decoding of the scalability layer corresponding to the entry in the first array variable has been initialized; and controlling the layer-wise startup by a second array variable, wherein each scalability layer of index i is associated with an entry in the second array variable indicative of whether a picture in the scalability layer corresponding to the entry in the second array variable has been decoded but may have been decoded incorrectly, and wherein the apparatus is further caused to:

when the layer-wise start-up is initiated, set the first array variable equal to 0 and the second array variable equal to 0 for all scalability layers other than the scalability layer with index i equal to 0; and when the second array variable of the scalability layer with index i is equal to 0, generate unavailable pictures for reference pictures of a first picture in decoding order in an enhancement layer with index i; and cause one or more decoded pictures to be output.

4. The apparatus according to claim 3, said at least one memory stored with code thereon, which when executed by said at least one processor, causes the apparatus to perform at least the following:

receive an indication of a type of the first coded picture separate from said indication of the association.

5. A computer program product embodied on a non-transitory computer readable medium, comprising computer program code configured to, when executed on at least one processor, cause an apparatus or a system to:

receive or obtain a bitstream including coded pictures in two or more scalability layers;

identify a first coded picture within the bitstream, the first coded picture having a picture type that may be used to start decoding;

conclude that a layer-wise start-up is initiated with the first coded picture on a basis of an indication received in or along the bitstream of an association of the first coded picture with the layer-wise start-up, wherein the layer-wise start-up comprises:

controlling the layer-wise startup by a first array variable, wherein each scalability layer of index i is associated with an entry in the first array variable indicative of whether correct decoding of the scalability layer corresponding to the entry in the first array variable has been initialized; and controlling the layer-wise startup by a second array variable, wherein each scalability layer of index i is associated with an entry in the second array variable indicative of whether a picture in the scalability layer corresponding to the entry in the second array variable has been decoded but may have been decoded incorrectly, and wherein the computer program code is also configured to, when executed on the at least one processor cause the apparatus or the system to:

when the layer-wise start-up is initiated, set the first array variable equal to 0 and the second array variable equal to 0 for all scalability layers other than the scalability layer with index i equal to 0; and when the second array variable of the scalability layer with index i is equal to 0, generate unavailable pictures for reference pictures of a first picture in decoding order in an enhancement layer with index i; and cause one or more decoded pictures to be output.

6. A method comprising:

receiving a bitstream including coded pictures in two or more scalability layers or encoding pictures into a bitstream in two or more scalability layers;

identifying a first coded picture within the bitstream, the first coded picture having a picture type that may be used to start decoding;

determining that a layer-wise start-up is initiated with the first coded picture;

indicating in or along the bitstream an association of the first coded picture with the layer-wise start-up, wherein the layer-wise start-up comprises:

controlling the layer-wise startup by a first array variable, wherein each scalability layer of index i is associated with an entry in the first array variable indicative of whether correct decoding of the scalability layer corresponding to the entry in the first array variable has been initialized; and controlling the layer-wise startup by a second array variable, wherein each scalability layer of index i is associated with an entry in the second array variable indicative of whether a picture in the scalability layer corresponding to the entry in the second array variable has been decoded but may have been decoded incorrectly, and wherein the method further comprises:

when the layer-wise start-up is initiated, setting the first array variable equal to 0 and the second array variable equal to 0 for all scalability layers other than the scalability layer with index i equal to 0; and when the second array variable of the scalability layer with index i is equal to 0, generating unavailable pictures for reference pictures of a first picture in decoding order in an enhancement layer with index i; and causing one or more decoded pictures to be output.

7. A method comprising:

receiving or obtaining a bitstream including coded pictures in two or more scalability layers;

identifying a first coded picture within the bitstream, the first coded picture having a picture type that may be used to start decoding;

concluding that a layer-wise start-up is initiated with the first coded picture on a basis of an indication received in or along the bitstream of an association of the first coded picture with the layer-wise start-up, wherein the layer-wise start-up comprises:

controlling the layer-wise startup by a first array variable, wherein each scalability layer of index i is associated with an entry in the first array variable indicative of whether correct decoding of the scalability layer corresponding to the entry in the first array variable has been initialized; and controlling the layer-wise startup by a second array variable, wherein each scalability layer of index i is associated with an entry in the second array variable indicative of whether a picture in the scalability layer corresponding to the entry in the second array variable has been decoded but may have been decoded incorrectly, and wherein the method further comprises:

when the layer-wise start-up is initiated, setting the first array variable equal to 0 and the second array variable equal to 0 for all scalability layers other than the scalability layer with index i equal to 0; and when the second array variable of the scalability layer with index i is equal to 0, generating unavailable pictures for reference pictures of a first picture in decoding order in an enhancement layer with index i; and causing one or more decoded pictures to be output.

8. The method according to claim 6:

wherein indicating in or along the bitstream said association is provided in one or more of the following syntax structures: slice header, slice segment header; picture parameter set; group of slices parameter set; picture header; access unit delimiter; picture delimiter; prefix network abstraction layer unit or suffix network abstraction layer unit.

9. The method according to claim 6 further comprising indicating in the bitstream a type of the first coded picture separately from indicating said association.

10. The method according to claim 6 further comprising: indicating said association in a 1-bit syntax element in a slice header.

11. The method according to claim 6 further comprising: indicating said association in a 1-bit syntax element in a slice header wherein the syntax element is omitted in a single-layer decoding process.

12. The method according to claim 6 wherein the layer-wise start-up further comprises one or more of the following:

generating unavailable pictures for the reference pictures of the first picture in decoding order in the enhancement layer;

omitting decoding of a coded picture in the enhancement layer preceding an intra random access point picture in the enhancement layer;

starting an output of pictures of the enhancement layer from an intra random access point picture in the enhancement layer when correct decoding of all reference layers of the enhancement layer has been initialized; or omitting the output of random access skipped leading pictures associated with the intra random access point picture in the enhancement layer.

13. The method according to claim 6 wherein the first array variable is LayerinitialisedFlag[i] and the second array variable is FirstPicInLayerDecodedFlag[i] and index i identifies the scalability layer and wherein the method further comprises the following:

when the layer-wise start-up is initiated, setting FirstPicInLayerDecoded[i] equal to 0 and LayerinitialisedFlag[i] equal to 0 for all scalability layers other than the scalability layer with index i equal to 0;

when FirstPicInLayerDecoded[i] is equal to 0, generating unavailable pictures for the reference pictures of the first picture in decoding order in an enhancement layer with index i;

setting LayerinitialisedFlag[i] equal to 1, when an intra random access point picture in an enhancement layer with index i is decoded and LayerinitialisedFlag[j] is equal to 1 for all values of j indicating the reference layers of the enhancement layer with index i;

omitting an output of random access skipped leading pictures associated with the intra random access point picture in the enhancement layer for which LayerinitialisedFlag[i] was set equal to 1.

14. The method according to claim 7:

wherein the indication is received in one or more of the following syntax structures: slice header, slice segment header; picture parameter set; group of slices parameter set; picture header; access unit delimiter; picture delimiter; prefix network abstraction layer unit or suffix network abstraction layer unit.

15. The method according to claim 7 further comprising: receiving an indication of a type of the first coded picture separate from said indication of the association.

16. The method according to claim 7 further comprising: receiving the indication of the association in a 1-bit syntax element in a slice header.

17. The method according to claim 7 further comprising: receiving the indication of the association in a 1-bit syntax element in a slice header wherein the syntax element is omitted in a single-layer decoding process.

18. The method according to claim 7 wherein the layer-wise start-up comprises one or more of the following:

generating unavailable pictures for the reference pictures of the first picture in decoding order in the enhancement layer;

omitting decoding of a coded picture in the enhancement layer preceding an intra random access point picture in the enhancement layer;

starting an output of pictures of the enhancement layer from the intra random access point picture in the enhancement layer when correct decoding of all reference layers of the enhancement layer has been initialized; or omitting the output of random access skipped leading pictures associated with the intra random access point picture in the enhancement layer.

19. The method according to claim 7 wherein the first array variable is LayerinitialisedFlag[i] and the second array variable is FirstPicInLayerDecodedFlag[i] and index i identifies the scalability layer and wherein the method further comprises the following:

when the layer-wise start-up is initiated, setting FirstPicInLayerDecoded[i] equal to 0 and LayerinitialisedFlag[i] equal to 0 for all scalability layers other than the scalability layer with index i equal to 0;

when FirstPicInLayerDecoded[i] is equal to 0, generating unavailable pictures for the reference pictures of the first picture in decoding order in an enhancement layer with index i;

setting LayerinitialisedFlag[i] equal to 1, when an intra random access point picture in an enhancement layer with index i is decoded and LayerinitialisedFlag[j] is equal to 1 for all values of j indicating reference layers of the enhancement layer with index i;

omitting an output of random access skipped leading pictures associated with the intra random access point picture in the enhancement layer for which LayerinitialisedFlag[i] was set equal to 1.

* * * * *